US009801088B2

(12) United States Patent
Xiao et al.

(10) Patent No.: US 9,801,088 B2
(45) Date of Patent: Oct. 24, 2017

(54) POSITIONING METHOD, APPARATUS, AND SYSTEM

(71) Applicant: HUAWEI TECHNOLOGIES CO., LTD., Shenzhen (CN)

(72) Inventors: Dengkun Xiao, Shenzhen (CN); Jie Cui, Tokyo (JP); Hong Li, Beijing (CN); Mir Yasir, Shenzhen (CN); Jiangbo Zhu, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 87 days.

(21) Appl. No.: 14/789,254

(22) Filed: Jul. 1, 2015

(65) Prior Publication Data

US 2015/0304877 A1 Oct. 22, 2015

Related U.S. Application Data

(63) Continuation of application No. PCT/CN2013/070025, filed on Jan. 4, 2013.

(51) Int. Cl.
*H04W 24/10* (2009.01)
*H04W 64/00* (2009.01)
(Continued)

(52) U.S. Cl.
CPC ......... *H04W 24/10* (2013.01); *G01S 5/0018* (2013.01); *G01S 5/0036* (2013.01); *G01S 5/0063* (2013.01);
(Continued)

(58) Field of Classification Search
None
See application file for complete search history.

(56) References Cited

U.S. PATENT DOCUMENTS 4,977,601 A   12/1990   Bicz
6,385,452 B1 * 5/2002   Zadeh ................ G01S 5/02
                                              342/357.4
(Continued)

FOREIGN PATENT DOCUMENTS

CN   101120265   2/2008
CN   101330732   12/2008
(Continued)

OTHER PUBLICATIONS

International Search Report mailed Oct. 17, 2013 in corresponding international application PCT/CN2013/070025.
(Continued)

*Primary Examiner* — Steven H Nguyen
(74) *Attorney, Agent, or Firm* — Staas & Halsey LLP

(57) ABSTRACT

Embodiments of the present invention relate to the field of communications, and provide a positioning method, apparatus, and system, so as to improve positioning precision. The method includes: determining, by a server, a positioning measurement parameter, and generating measurement configuration information carrying the positioning measurement parameter, where the positioning measurement parameter is a parameter that the server requests a terminal to measure and is used to position the terminal; sending, by the server, the measurement configuration information to the terminal through a base station; receiving, by the server through the base station, configuration response information returned by the terminal, where the configuration response information carries a positioning response parameter, and the positioning response parameter is a measurement result generated after the terminal measures the positioning measurement parameter; and positioning, by the server, the terminal according to the positioning response parameter carried in the configuration response information.

17 Claims, 7 Drawing Sheets

(51) Int. Cl.
*G01S 5/00* (2006.01)
*G01S 5/02* (2010.01)
*H04W 88/02* (2009.01)
*H04W 88/08* (2009.01)

(52) U.S. Cl.
CPC ............ *G01S 5/021* (2013.01); *H04W 64/00* (2013.01); *H04W 64/003* (2013.01); *G01S 5/0236* (2013.01); *H04W 88/02* (2013.01); *H04W 88/08* (2013.01)

(56) References Cited

U.S. PATENT DOCUMENTS

| | | | | |
|---|---|---|---|---|
| 8,553,563 B2* | 10/2013 | Suzuki | ................. | H04W 24/10 370/241 |
| 8,718,022 B2* | 5/2014 | Aoyama | ............... | H04W 24/00 345/619 |
| 9,220,028 B2* | 12/2015 | Suzuki | ................. | H04W 24/10 |
| 9,301,180 B2* | 3/2016 | Suzuki | ................. | H04W 24/10 |
| 2008/0139219 A1 | 6/2008 | Boeiro et al. | | |
| 2011/0012784 A1 | 1/2011 | Alizadeh-Shabdiz | | |
| 2011/0053613 A1 | 3/2011 | Zhou et al. | | |
| 2011/0090812 A1* | 4/2011 | Aoyama | ............... | H04W 24/00 370/252 |
| 2011/0201279 A1* | 8/2011 | Suzuki | ................. | H04W 24/10 455/67.11 |
| 2012/0039189 A1* | 2/2012 | Suzuki | ................. | H04W 24/10 370/252 |
| 2012/0039365 A1* | 2/2012 | Suzuki | ................... | G01S 19/05 375/147 |
| 2012/0100856 A1* | 4/2012 | Ishida | ................... | H04W 36/04 455/436 |
| 2012/0113837 A1* | 5/2012 | Siomina | ............... | H04W 24/10 370/252 |
| 2012/0127876 A1* | 5/2012 | Hunukumbure | ...... | H04W 24/00 370/252 |
| 2012/0276897 A1* | 11/2012 | Kwon | ................. | H04B 1/1027 455/423 |
| 2013/0010631 A1* | 1/2013 | Jung | ..................... | H04W 24/10 370/252 |
| 2013/0052959 A1* | 2/2013 | Rubin | ................... | H04W 24/08 455/67.11 |
| 2013/0084888 A1* | 4/2013 | Johansson | ............. | H04W 24/08 455/456.1 |
| 2013/0115959 A1* | 5/2013 | Amirijoo | .......... | H04W 36/0083 455/440 |
| 2013/0165108 A1* | 6/2013 | Xu | ........................ | H04W 24/04 455/423 |
| 2013/0188510 A1* | 7/2013 | Siomina | ................ | H04W 24/10 370/252 |
| 2013/0201848 A1* | 8/2013 | Kazmi | ................. | H04W 24/00 370/252 |
| 2013/0294281 A1* | 11/2013 | Lee | ...................... | H04W 24/10 370/252 |
| 2013/0316713 A1* | 11/2013 | Xu | ....................... | H04W 36/32 455/438 |
| 2014/0220963 A1* | 8/2014 | Jung | ..................... | H04W 48/16 455/422.1 |
| 2014/0220982 A1* | 8/2014 | Jung | ........................ | H04W 8/26 455/437 |
| 2014/0315577 A1* | 10/2014 | Yokoyama | ............ | H04W 24/04 455/456.1 |
| 2014/0357297 A1* | 12/2014 | Futaki | ................... | H04W 24/10 455/456.1 |
| 2015/0044972 A1* | 2/2015 | Lee | ........................ | H04W 24/10 455/67.11 |
| 2015/0056925 A1* | 2/2015 | Jung | ..................... | H04W 24/10 455/67.11 |
| 2015/0208267 A1* | 7/2015 | Jung | ..................... | H04W 64/00 455/456.1 |
| 2015/0249930 A1* | 9/2015 | Andrianov | ............ | H04W 24/08 455/423 |

FOREIGN PATENT DOCUMENTS

| | | |
|---|---|---|
| CN | 101489231 | 7/2009 |
| CN | 102006547 | 4/2011 |
| EP | 0 262 186 B1 | 7/1995 |
| EP | 1 443 791 A1 | 8/2004 |
| EP | 1 785 741 A1 | 5/2007 |
| EP | 2 124 167 A1 | 11/2009 |
| EP | 2 523 497 A1 | 11/2012 |
| WO | 99/46947 | 9/1999 |
| WO | 99/61934 | 12/1999 |
| WO | 2011/099909 A1 | 8/2011 |
| WO | 2011/148211 A1 | 12/2011 |

OTHER PUBLICATIONS

Extended European Search Report dated Nov. 4, 2015 in corresponding European Patent Application No. 13870036.4.
PCT International Search Report dated Oct. 17, 2013 in corresponding International Patent Application No. PCT/CN2013/070025.
"3$^{rd}$ Generation Partnership Project; Technical Specification Group Radio Access Network; Evolved Universal Terrestrial Radio Access (E-UTRA); Base Station (BS) radio transmission and reception (Release 11)", 3GPP TS 36.104, V11.2.0, Sep. 2012, pp. 1-121.
"3$^{rd}$ Generation Partnership Project; Technical Specification Group Radio Access Network; Evolved Universal Terrestrial Radio Access (E-UTRA); LTE Positioning Protocol A (LPPa) (Release 11)", 3GPP TS 36.455, V11.1.0, Dec. 2012, pp. 1-52.
"3$^{rd}$ Generation Partnership Project; Technical Specification Group Radio Access Network; Evolved Universal Terrestrial Radio Access (E-UTRA); LTE Positioning Protocol (LPP) (Release 11)", 3GPP TS 36.355, V11.0.0, Sep. 2012, pp. 1-117.
"3$^{rd}$ Generation Partnership Project; Technical Specification Group Radio Access Network; Evolved Universal Terrestrial Radio Access (E-UTRA); Radio Resource Control (RRC); Protocol specification (Release 11)", 3GPP TS 36.331, V11.2.0, Dec. 2012, pp. 1-340.
"3$^{rd}$ Generation Partnership Project; Technical Specification Group Radio Access Network; Evolved Universal Terrestrial Radio Access (E-UTRA); Physical layer procedures (Release 11)", 3GPP TS 36.213, V11.1.0, Dec. 2012, pp. 1-160.
"3$^{rd}$ Generation Partnership Project; Technical Specification Group Radio Access Network; Evolved Universal Terrestrial Radio Access (E-UTRA); Requirements for Support of radio resource management (Release 11)", 3GPP TS 36.133, V11.2.0, Sep. 2012, pp. 1-672.

* cited by examiner

POSITIONING METHOD, APPARATUS, AND SYSTEM

CROSS REFERENCE

This application is a continuation of International Application No. PCT/CN2013/070025, filed Jan. 4, 2013, which is hereby incorporated by reference in its entirety.

TECHNICAL FIELD

Embodiments of the present invention relate to the field of communications, and in particular, to a positioning method, apparatus, and system.

BACKGROUND

In the prior art, a commonly used positioning manner in cellular mobile communications is CID (Cell Identification, cell identification) positioning. The CID positioning presents a geographical position of a UE according to an ID (Identification, identification) of a base station where the UE is located. A network side may know a base station and geographical information of the base station according to an ID of the base station in a cellular network, and therefore may determine a geographical position of a UE.

A UE can be positioned in the CID positioning manner. However, in this positioning manner, positioning is performed only according to an ID of a serving base station of the UE, and positioning precision is low.

SUMMARY

Embodiments of the present invention provide a positioning method, apparatus, and system, so as to improve positioning precision.

In order to achieve the foregoing objective, the embodiments of the present invention adopt the following technical solutions:

According to a first aspect, an embodiment of the present invention provides a positioning method, including: determining, by a server, a positioning measurement parameter, and generating measurement configuration information carrying the positioning measurement parameter, where the positioning measurement parameter is a parameter that the server requests a terminal to measure and is used to position the terminal, and the positioning measurement parameter includes at least one of the following parameters or parameter combinations: a precoding matrix indicator PMI/rank indicator RI characteristic and the number of multiple paths of the terminal, a handover failure rate measured by the terminal, a radio link failure rate measured by the terminal, a signal to interference plus noise ratio of the terminal, and the number of cells from which the terminal receives strong interference; sending, by the server, the measurement configuration information to the terminal through a base station; receiving, by the server through the base station, configuration response information returned by the terminal, where the configuration response information carries a positioning response parameter, and the positioning response parameter is a measurement result generated after the terminal measures the positioning measurement parameter; and positioning, by the server, the terminal according to the positioning response parameter carried in the configuration response information.

In a first possible implementation manner of the first aspect, before the determining, by a server, a positioning measurement parameter, the method further includes: sending, by the server, a request message for obtaining scenario information of the terminal to the base station, and obtaining the scenario information of the terminal from a response message fed back by the base station; and the determining, by a server, a positioning measurement parameter includes: determining, by the server, the positioning measurement parameter according to the obtained scenario information of the terminal.

With reference to the first possible implementation manner of the first aspect, in a second possible implementation manner, the determining, by the server, the positioning measurement parameter according to the obtained scenario information of the terminal includes at least one of the following: if the scenario information of the terminal includes: carrier aggregation CA scenario information, determining, by the server, the signal to interference plus noise ratio of the terminal, the number of cells from which the terminal receives strong interference, and the PMI/RI characteristic and the number of multiple paths of the terminal as the positioning measurement parameters; if the scenario information of the terminal includes: coordinated multi-point CoMP scenario information, determining, by the server, the signal to interference plus noise ratio of the terminal, the number of cells from which the terminal receives strong interference, and the PMI/RI characteristic and the number of multiple paths of the terminal as the positioning measurement parameters; and if the scenario information of the terminal includes: minimization of drive tests MDT scenario information, determining, by the server, the handover failure rate measured by the terminal and the radio link failure rate measured by the terminal as the positioning measurement parameters.

With reference to the second possible implementation manner of the first aspect, in a third possible implementation manner, the determining, by the server, the positioning measurement parameter according to the obtained scenario information of the terminal further includes at least one of the following: if the scenario information of the terminal includes: the CA scenario information, further determining, by the server, the number of carriers used by the terminal and an angle of rotation relative to a true north direction as the positioning measurement parameters, where the angle of rotation is measured by a gyroscope of the terminal; if the scenario information of the terminal includes: the CoMP scenario information, further determining, by the server, the number of measurement access point(s) used by the terminal and signal strength, and the angle of rotation relative to the true north direction as the positioning measurement parameters, where the angle of rotation is measured by the gyroscope of the terminal; and if the scenario information of the terminal includes: wide area network WAN or wireless fidelity WiFi scenario information, further determining, by the server, the number of access point(s) and access point identification(s) as the positioning measurement parameters, where the access point(s) and the access point identification(s) are detected by the terminal.

With reference to the first aspect, or the first possible implementation manner of the first aspect, or the second possible implementation manner of the first aspect, in a fourth possible implementation manner, the positioning measurement parameter further includes at least one of the following parameters or parameter combinations: the number of carriers used by the terminal, the number of measurement access point(s) used by the terminal and signal strength, an angle of rotation relative to a true north direction, and the number of access point(s) and access point identification(s), where the angle of rotation is measured by a gyroscope of the terminal, and the access point(s) and the access point identification(s) are detected by the terminal.

With reference to the first aspect, or the first possible implementation manner of the first aspect, or the second possible implementation manner of the first aspect, or the third possible implementation manner of the first aspect, or the fourth possible implementation manner of the first aspect, in a fifth possible implementation manner, before the positioning, by the server, the terminal according to the positioning response parameter carried in the configuration response information, the method further includes: saving, by the server, positioning parameter values that correspond to all rasters after a network is rasterized; and the positioning, by the server, the terminal according to the positioning response parameter carried in the configuration response information includes: comparing, by the server, the positioning response parameter with the positioning parameter values corresponding to all rasters, using a raster with a positioning parameter value closest to the positioning response parameter as a matched raster, and using a position of the matched raster as a position of the terminal.

According to a second aspect, an embodiment of the present invention provides a positioning method, including: obtaining, by a terminal, measurement configuration information that is sent by a server through a base station, where the measurement configuration information carries a positioning measurement parameter, the positioning measurement parameter is a parameter that the server requests the terminal to measure and is used to position the terminal, and the positioning measurement parameter includes at least one of the following parameters or parameter combinations: a precoding matrix indicator PMI/rank indicator RI characteristic and the number of multiple paths of the terminal, a handover failure rate measured by the terminal, a radio link failure rate measured by the terminal, a signal to interference plus noise ratio of the terminal, and the number of cells from which the terminal receives strong interference; performing, by the terminal, measurement according to the positioning measurement parameter carried in the measurement configuration information, to obtain a positioning response parameter, and generating configuration response information carrying the positioning response parameter, where the positioning response parameter is a measurement result generated after the terminal measures the positioning measurement parameter; and sending, by the terminal, the configuration response information to the server through the base station, where the configuration response information carries the positioning response parameter, so that the server positions the terminal according to the positioning response parameter.

In a first possible implementation manner of the second aspect, if scenario information of the terminal includes: carrier aggregation CA scenario information, the positioning measurement parameter includes: the signal to interference plus noise ratio of the terminal, the number of cells from which the terminal receives strong interference, and the PMI/RI characteristic and the number of multiple paths of the terminal; or, if scenario information of the terminal includes: coordinated multi-point CoMP scenario information, the positioning measurement parameter includes: the signal to interference plus noise ratio of the terminal, the number of cells from which the terminal receives strong interference, and the PMI/RI characteristic and the number of multiple paths of the terminal; or, if scenario information of the terminal includes: minimization of drive tests MDT scenario information, the positioning measurement parameter includes: the handover failure rate measured by the terminal and the radio link failure rate measured by the terminal.

With reference to the first possible implementation manner of the second aspect, in a second possible implementation manner, if the scenario information of the terminal includes: the CA scenario information, the positioning measurement parameter further includes: the number of carriers used by the terminal and an angle of rotation relative to a true north direction, where the angle of rotation is measured by a gyroscope of the terminal; or, if the scenario information of the terminal includes: the CoMP scenario information, the positioning measurement parameter further includes: the number of measurement access point(s) used by the terminal and signal strength, and an angle of rotation relative to a true north direction, where the angle of rotation is measured by a gyroscope of the terminal; or, if the scenario information of the terminal includes: wide area network WAN or wireless fidelity WiFi scenario information, the positioning measurement parameter further includes: the number of access point(s) and access point identification(s), where the access point(s) and the access point identification(s) are detected by the terminal.

With reference to the second aspect, or the first possible implementation manner of the second aspect, in a third possible implementation manner, the positioning measurement parameter further includes at least one of the following parameters or parameter combinations: the number of carriers used by the terminal, the number of measurement access point(s) used by the terminal and signal strength, an angle of rotation relative to a true north direction, and the number of access point(s) and access point identification(s), where the angle of rotation is measured by a gyroscope of the terminal, and the access point(s) and the access point identification(s) are detected by the terminal.

According to a third aspect, an embodiment of the present invention provides a positioning method, including: receiving, by a base station, measurement configuration information sent by a server, where the measurement configuration information carries a positioning measurement parameter, the positioning measurement parameter is a parameter that the server requests a terminal to measure and is used to position the terminal, and the positioning measurement parameter includes at least one of the following parameters or parameter combinations: a precoding matrix indicator PMI/rank indicator RI characteristic and the number of multiple paths of the terminal, a handover failure rate measured by the terminal, a radio link failure rate measured by the terminal, a signal to interference plus noise ratio of the terminal, and the number of cells from which the terminal receives strong interference; sending, by the base station, the measurement configuration information to the terminal; receiving, by the base station, configuration response information sent by the terminal, where the configuration response information carries a positioning response parameter, and the positioning response parameter is a measurement result generated after the terminal measures the positioning measurement parameter; and sending, by the base station, the configuration response information to the server, so that the server positions the terminal according to the positioning response parameter.

In a first possible implementation manner of the third aspect, the sending, by the base station, the measurement configuration information to the terminal includes: parsing, by the base station, the measurement configuration information, to obtain the positioning measurement parameter; generating, by the base station, first measurement configuration information, and adding the positioning measurement parameter to the first measurement configuration information; and sending the first measurement configuration information to the terminal; and the receiving, by the base station, configuration response information sent by the terminal includes: receiving, by the base station, first configuration response information sent by the terminal, where the first configuration response information carries a positioning response parameter; parsing, by the base station, the first configuration response information, to obtain the positioning response parameter; and generating, by the base station, configuration response information sent to the server, and adding the positioning response parameter to the configuration response information.

With reference to the third aspect, or the first possible implementation manner of the third aspect, in a second possible implementation manner, if scenario information of the terminal includes: carrier aggregation CA scenario information, the positioning measurement parameter includes: the signal to interference plus noise ratio of the terminal, the number of cells from which the terminal receives strong interference, and the PMI/RI characteristic and the number of multiple paths of the terminal; or, if scenario information of the terminal includes: coordinated multi-point CoMP scenario information, the positioning measurement parameter includes: the signal to interference plus noise ratio of the terminal, the number of cells from which the terminal receives strong interference, and the PMI/RI characteristic and the number of multiple paths of the terminal; or, if scenario information of the terminal includes: minimization of drive tests MDT scenario information, the positioning measurement parameter includes: the handover failure rate measured by the terminal and the radio link failure rate measured by the terminal.

With reference to the second possible implementation manner of the third aspect, in a third possible implementation manner, if the scenario information of the terminal includes: the CA scenario information, the positioning measurement parameter further includes: the number of carriers used by the terminal and an angle of rotation relative to a true north direction, where the angle of rotation is measured by a gyroscope of the terminal; or, if the scenario information of the terminal includes: the CoMP scenario information, the positioning measurement parameter further includes: the number of measurement access point(s) used by the terminal and signal strength, and an angle of rotation relative to a true north direction, where the angle of rotation is measured by a gyroscope of the terminal; or, if the scenario information of the terminal includes: wide area network WAN or wireless fidelity WiFi scenario information, the positioning measurement parameter further includes: the number of access point(s) and access point identification(s), where the access point(s) and the access point identification(s) are detected by the terminal.

With reference to the third aspect, or the first possible implementation manner of the third aspect, or the second possible implementation manner of the third aspect, in a fourth possible implementation manner, the positioning measurement parameter further includes at least one of the following parameters or parameter combinations: the number of carriers used by the terminal, the number of measurement access point(s) used by the terminal and signal strength, an angle of rotation relative to a true north direction, and the number of access point(s) and access point identification(s), where the angle of rotation is measured by a gyroscope of the terminal, and the access point(s) and the access point identification(s) are detected by the terminal.

According to a fourth aspect, an embodiment of the present invention provides a server, including: a processing unit, configured to determine a positioning measurement parameter, generate measurement configuration information carrying the positioning measurement parameter, and send the measurement configuration information to a terminal through a sending unit, where the positioning measurement parameter is a parameter that the server requests the terminal to measure and is used to position the terminal, and the positioning measurement parameter includes at least one of the following parameters or parameter combinations: a precoding matrix indicator PMI/rank indicator RI characteristic and the number of multiple paths of the terminal, a handover failure rate measured by the terminal, a radio link failure rate measured by the terminal, a signal to interference plus noise ratio of the terminal, and the number of cells from which the terminal receives strong interference; the sending unit, configured to send the measurement configuration information generated by the processing unit to the terminal through a base station; and a receiving unit, configured to receive, through the base station, configuration response information returned by the terminal, where the configuration response information carries a positioning response parameter, and the positioning response parameter is a measurement result generated after the terminal measures the positioning measurement parameter, where the processing unit is further configured to position the terminal according to the positioning response parameter carried in the configuration response information received by the receiving unit.

In a first possible implementation manner of the fourth aspect, the processing unit is further configured to send a request message for obtaining scenario information of the terminal to the base station, and obtain the scenario information of the terminal from a response message fed back by the base station; and the processing unit being configured to determine a positioning measurement parameter includes: determining the positioning measurement parameter according to the obtained scenario information of the terminal.

With reference to the first possible implementation manner of the fourth aspect, in a second possible implementation manner, the processing unit being configured to determine the positioning measurement parameter according to the obtained scenario information of the terminal includes at least one of the following: if the scenario information of the terminal includes: carrier aggregation CA scenario information, determining the signal to interference plus noise ratio of the terminal, the number of cells from which the terminal receives strong interference, and the PMI/RI characteristic and the number of multiple paths of the terminal as the positioning measurement parameters; if the scenario information of the terminal includes: coordinated multi-point CoMP scenario information, determining the signal to interference plus noise ratio of the terminal, the number of cells from which the terminal receives strong interference, and the PMI/RI characteristic and the number of multiple paths of the terminal as the positioning measurement parameters; and if the scenario information of the terminal includes: minimization of drive tests MDT scenario information, determining the handover failure rate measured by the terminal and the radio link failure rate measured by the terminal as the positioning measurement parameters.

With reference to the second possible implementation manner of the fourth aspect, in a third possible implementation manner, the processing unit being configured to determine the positioning measurement parameter according to the obtained scenario information of the terminal includes at least one of the following: if the scenario information of the terminal includes: the CA scenario information, further determining the number of carriers used by the terminal and an angle of rotation relative to a true north direction as the positioning measurement parameters, where the angle of rotation is measured by a gyroscope of the terminal; if the scenario information of the terminal includes: the CoMP scenario information, further determining the number of measurement access point(s) used by the terminal and signal strength, and the angle of rotation relative to the true north direction as the positioning measurement parameters, where the angle of rotation is measured by the gyroscope of the terminal; and if the scenario information of the terminal includes: wide area network WAN or wireless fidelity WiFi scenario information, further determining the number of access point(s) and access point identification(s) as the positioning measurement parameters, where the access point(s) and the access point identification(s) are detected by the terminal.

With reference to the fourth aspect, or the first possible implementation manner of the fourth aspect, or the second possible implementation manner of the fourth aspect, in a fourth possible implementation manner of the fourth aspect, the positioning measurement parameter further includes at least one of the following parameters or parameter combinations: the number of carriers used by the terminal, the number of measurement access point(s) used by the terminal and signal strength, an angle of rotation relative to a true north direction, and the number of access point(s) and access point identification(s), where the angle of rotation is measured by a gyroscope of the terminal, and the access point(s) and the access point identification(s) are detected by the terminal.

With reference to the fourth aspect, or the first possible implementation manner of the fourth aspect, or the second possible implementation of the fourth aspect, or the third possible implementation manner of the fourth aspect, or the fourth possible implementation manner of the fourth aspect, in a fifth possible implementation manner, the processing unit is further configured to save positioning parameter values that correspond to all rasters after a network is rasterized; and the processing unit being configured to position the terminal according to the positioning response parameter carried in the configuration response information received by the receiving unit includes: comparing the positioning response parameter with the positioning parameter values that correspond to all rasters after a network is rasterized, using a raster with a positioning parameter value closest to the positioning response parameter as a matched raster, and using a position of the matched raster as a position of the terminal.

According to a fifth aspect, an embodiment of the present invention provides a terminal, including: a receiving unit, configured to obtain measurement configuration information sent by a server, where the measurement configuration information carries a positioning measurement parameter, the positioning measurement parameter is a parameter that the server requests a terminal to measure and is used to position the terminal, and the positioning measurement parameter includes at least one of the following parameters or parameter combinations: a precoding matrix indicator PMI/rank indicator RI characteristic and the number of multiple paths of the terminal, a handover failure rate measured by the terminal, a radio link failure rate measured by the terminal, a signal to interference plus noise ratio of the terminal, and the number of cells from which the terminal receives strong interference; a processing unit, configured to perform measurement according to the positioning measurement parameter carried in the measurement configuration information received by the receiving unit, to obtain a positioning response parameter, where the positioning response parameter is a measurement result generated after the terminal measures the positioning measurement parameter; and a sending unit, configured to send configuration response information to the server through the base station, where the configuration response information carries the positioning response parameter.

In a first possible implementation manner of the fifth aspect, if scenario information of the terminal includes: carrier aggregation CA scenario information, the positioning measurement parameter received by the receiving unit includes: the signal to interference plus noise ratio of the terminal, the number of cells from which the terminal receives strong interference, and the PMI/RI characteristic and the number of multiple paths of the terminal; or, if scenario information of the terminal includes: coordinated multi-point CoMP scenario information, the positioning measurement parameter received by the receiving unit includes: the signal to interference plus noise ratio of the terminal, the number of cells from which the terminal receives strong interference, and the PMI/RI characteristic and the number of multiple paths of the terminal; or, if scenario information of the terminal includes: minimization of drive tests MDT scenario information, the positioning measurement parameter received by the receiving unit includes: the handover failure rate measured by the terminal and the radio link failure rate measured by the terminal.

With reference to the first possible implementation manner of the fifth aspect, in a second possible implementation manner, if the scenario information of the terminal includes: the CA scenario information, the positioning measurement parameter received by the receiving unit further includes: the number of carriers used by the terminal and an angle of rotation relative to a true north direction, where the angle of rotation is measured by a gyroscope of the terminal; or, if the scenario information of the terminal includes: the CoMP scenario information, the positioning measurement parameter received by the receiving unit further includes: the number of measurement access point(s) used by the terminal and signal strength, and an angle of rotation relative to a true north direction, where the angle of rotation is measured by a gyroscope of the terminal; or, if the scenario information of the terminal includes: wide area network WAN or wireless fidelity WiFi scenario information, the positioning measurement parameter received by the receiving unit further includes: the number of access point(s) and access point identification(s), where the access point(s) and the access point identification(s) are detected by the terminal.

With reference to the fifth aspect, or the first possible implementation manner of the fifth aspect, in a third possible implementation manner, the positioning measurement parameter received by the receiving unit further includes at least one of the following parameters or parameter combinations: the number of carriers used by the terminal, the number of measurement access point(s) used by the terminal and signal strength, an angle of rotation relative to a true north direction, and the number of access point(s) and access point identification(s), where the angle of rotation is measured by a gyroscope of the terminal, and the access point(s) and the access point identification(s) are detected by the terminal.

According to a sixth aspect, an embodiment of the present invention provides a base station, including: a receiving unit, configured to receive measurement configuration information sent by a server, where the measurement configuration information carries a positioning measurement parameter, the positioning measurement parameter is a parameter that the server requests a terminal to measure and is used to position the terminal, and the positioning measurement parameter includes at least one of the following parameters or parameter combinations: a precoding matrix indicator PMI/rank indicator RI characteristic and the number of multiple paths of the terminal, a handover failure rate measured by the terminal, a radio link failure rate measured by the terminal, a signal to interference plus noise ratio of the terminal, and the number of cells from which the terminal receives strong interference; and a sending unit, configured to send the measurement configuration information received by the receiving unit to the terminal, where the receiving unit is further configured to receive configuration response information sent by the terminal, where the configuration response information carries a positioning response parameter, and the positioning response parameter is a measurement result generated after the terminal measures the positioning measurement parameter; and the sending unit is further configured to send the configuration response information received by the receiving unit to the server, so that the server positions the terminal according to the positioning response parameter.

In a first possible implementation manner of the sixth aspect, the base station further includes a processing unit, configured to parse the measurement configuration information received by the receiving unit, to obtain the positioning measurement parameter, where the processing unit is further configured to generate first measurement configuration information, and add the positioning measurement parameter to the first measurement configuration information; the sending unit being configured to send the measurement configuration information received by the receiving unit to the terminal includes: sending the first measurement configuration information generated by the processing unit to the terminal; the receiving unit being configured to receive configuration response information sent by the terminal includes: receiving first configuration response information sent by the terminal, where the first configuration response information carries the positioning response parameter; the processing unit is further configured to parse the first configuration response information received by the receiving unit, to obtain the positioning response parameter; the processing unit is further configured to generate configuration response information sent to the server, and add the positioning response parameter to the configuration response information; and the sending unit being configured to send the configuration response information received by the receiving unit to the server includes: sending the configuration response information generated by the processing unit to the server.

With reference to the sixth aspect, or the first possible implementation manner of the sixth aspect, in a second possible implementation manner, if scenario information of the terminal includes: carrier aggregation CA scenario information, the positioning measurement parameter received by the receiving unit includes: the signal to interference plus noise ratio of the terminal, the number of cells from which the terminal receives strong interference, and the PMI/RI characteristic and the number of multiple paths of the terminal; or, if scenario information of the terminal includes: coordinated multi-point CoMP scenario information, the positioning measurement parameter received by the receiving unit includes: the signal to interference plus noise ratio of the terminal, the number of cells from which the terminal receives strong interference, and the PMI/RI characteristic and the number of multiple paths of the terminal; or, if scenario information of the terminal includes: minimization of drive tests MDT scenario information, the positioning measurement parameter received by the receiving unit includes: the handover failure rate measured by the terminal and the radio link failure rate measured by the terminal.

With reference to the second possible implementation manner of the sixth aspect, in a third possible implementation manner, if the scenario information of the terminal includes: the CA scenario information, the positioning measurement parameter received by the receiving unit further includes: the number of carriers used by the terminal and an angle of rotation relative to a true north direction, where the angle of rotation is measured by a gyroscope of the terminal; or, if the scenario information of the terminal includes: the CoMP scenario information, the positioning measurement parameter received by the receiving unit further includes: the number of measurement access point(s) used by the terminal and signal strength, and an angle of rotation relative to a true north direction, where the angle of rotation is measured by a gyroscope of the terminal; or, if the scenario information of the terminal includes: wide area network WAN or wireless fidelity WiFi scenario information, the positioning measurement parameter received by the receiving unit further includes: the number of access point(s) and access point identification(s), where the access point(s) and the access point identification(s) are detected by the terminal.

With reference to the sixth aspect, or the first possible implementation manner of the sixth aspect, or the second possible implementation manner of the sixth aspect, in a fourth possible implementation manner, the positioning measurement parameter received by the receiving unit further includes at least one of the following parameters or parameter combinations: the number of carriers used by the terminal, the number of measurement access point(s) used by the terminal and signal strength, an angle of rotation relative to a true north direction, and the number of access point(s) and access point identification(s), where the angle of rotation is measured by a gyroscope of the terminal, and the access point(s) and the access point identification(s) are detected by the terminal.

According to a seventh aspect, an embodiment of the present invention provides a positioning system, including: a server, a terminal, and a base station, where the server is the server described in the foregoing embodiments; the terminal is the terminal described in the foregoing embodiments; and the base station is the base station described in the foregoing embodiments.

In the positioning method, apparatus, and system provided by the embodiments of the present invention, a server sends measurement configuration information carrying a positioning measurement parameter, so that when receiving the measurement configuration information, a base station sends the measurement configuration information to a terminal; after receiving the measurement configuration information, the terminal performs measurement according to the positioning measurement parameter carried in the measurement configuration information, to obtain a positioning response parameter, and sends configuration response information carrying the positioning response parameter to the server through the base station; and when receiving the configuration response information, the server positions the terminal according to the positioning response parameter. In this way, the server sends the positioning measurement parameter to the terminal, so that the terminal performs measurement according to the positioning measurement parameter, and returns a measurement result to the server in a form of the positioning response parameter; and the server positions the terminal according to the positioning response parameter, so that the server positions the terminal according to at least one parameter of the terminal related to a position of the terminal, which can position the terminal more accurately, thereby improving the positioning precision.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by a person of ordinary skill in the art based on the embodiments of the present invention without creative efforts shall fall within the protection scope of the present invention.

Figure 1:
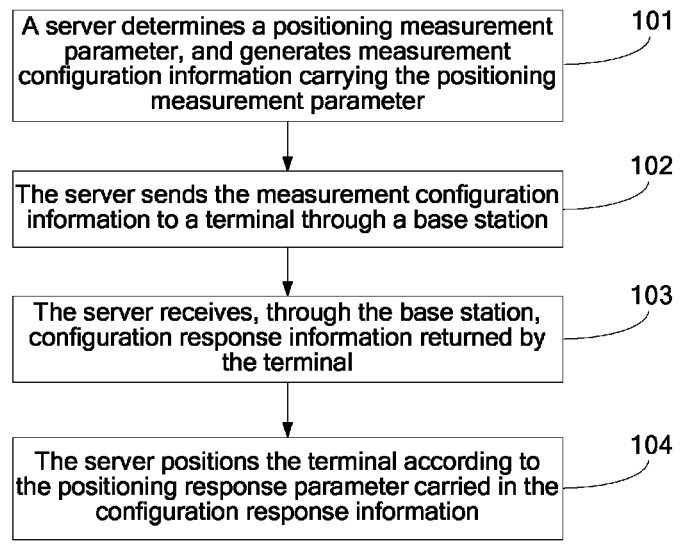
FIG. 1 is a schematic diagram of a positioning method according to an embodiment of the present invention.

An embodiment of the present invention provides a positioning method. As shown in FIG. 1, the method includes:

101: A server determines a positioning measurement parameter, and generates measurement configuration information carrying the positioning measurement parameter.

The positioning measurement parameter is a parameter that the server requests a terminal to measure and is used to position the terminal. The positioning measurement parameter includes at least one of the following parameters or parameter combinations:

a PMI (Precoding Matrix Indicator, precoding matrix indicator)/RI (Rank Indicator, rank indicator) and the number of multiple paths of the terminal, a handover failure rate measured by the terminal, a radio link failure rate measured by the terminal, a signal to interference plus noise ratio of the terminal, and the number of cells from which the terminal receives strong interference.

It should be noted that, the positioning measurement parameter may also be another parameter that can enable the server to position the terminal, which is not limited in the present invention.

Specifically, the server determines the positioning measurement parameter, and when generating the measurement configuration information, adds the positioning measurement parameter to the measurement configuration information.

Further, the server may determine, according to different scenarios in which a terminal to be positioned is located, a positioning measurement parameter corresponding to the terminal to be positioned. In this case, the server first needs to obtain scenario information of the terminal.

Specifically, the method of obtaining, by the server, the scenario information of the terminal may be: sending, by the server, a request message to the terminal through a base station, so as to obtain the scenario information of the terminal.

If the server sends the base station a request message of LPPa (LTE (Long-Term Evolution, long term evolution) Positioning Protocol A, LTE positioning protocol a), the base station parses the request message after receiving the request message. When the base station has obtained the scenario information of the terminal, the base station sends the obtained scenario information of the terminal to the server. When the base station does not obtain the scenario information of the terminal, the base station may send the request message to the terminal, so that the terminal returns the scenario information, and the base station sends the scenario information returned by the terminal to the server.

If the server sends the base station a request message of LPP (LTE (Long-Term Evolution, long term evolution) Positioning Protocol, LTE positioning protocol), the base station directly sends the message to the terminal after receiving the request message, so that the terminal returns the scenario information, and the base station directly sends the scenario information to the server after receiving the scenario information of the terminal. That is, for the request message of LPP, the base station only implements a forwarding function, and does not parse the request message, which means that the base station transparently transmits the request message to the terminal, and transparently transmits the received scenario information of the terminal to the server.

It should be noted that, the server may also obtain the scenario information of the terminal by using another method, which is not limited in the present invention.

If the scenario information of the terminal includes: CA (Carrier Aggregation, carrier aggregation) scenario information, the server determines the signal to interference plus noise ratio, the number of cells from which the terminal receives strong interference, and the PMI/RI characteristic and the number of multiple paths of the terminal as the positioning measurement parameters.

If the scenario information of the terminal includes: CoMP (Coordinated Multi-Point, coordinated multi-point) scenario information, the server determines the signal to interference plus noise ratio, the number of cells from which the terminal receives strong interference, and the PMI/RI characteristic and the number of multiple paths of the terminal as the positioning measurement parameters.

If the scenario information of the terminal includes: MDT (Minimization of Drive Tests, minimization of drive tests) scenario information, the server determines the handover failure rate measured by the terminal and the radio link failure rate measured by the terminal as the positioning measurement parameters.

If the scenario information of the terminal includes: WiFi (Wireless Fidelity, wireless fidelity) or WAN (Wide Area Network, wide area network) scenario information, the server determines at least one of the following parameters or parameter combinations as the positioning measurement parameter: the precoding matrix indicator PMI/rank indicator RI characteristic and the number of multiple paths of the terminal, the handover failure rate measured by the terminal, the radio link failure rate measured by the terminal, the signal to interference plus noise ratio of the terminal, and the number of cells from which the terminal receives strong interference.

Further, if the scenario information of the terminal includes: the CA scenario information, the server further determines the number of carriers used by the terminal and an angle of rotation relative to a true north direction as the positioning measurement parameters, where the angle of rotation is measured by a gyroscope of the terminal.

If the scenario information of the terminal includes: the CoMP scenario information, the server further determines the number of measurement access point(s) used by the terminal and signal strength, and the angle of rotation relative to the true north direction as the positioning measurement parameters, where the angle of rotation is measured by the gyroscope of the terminal.

If the scenario information of the terminal includes: the WAN or WiFi scenario information, the server further determines the number of access point(s) and access point identification(s) as the positioning measurement parameters, where the access point(s) and the access point identification(s) are detected by the terminal.

If the scenario information of the terminal includes: the MDT scenario information, the server further determines the number of carriers used by the terminal, the number of measurement access point(s) used by the terminal and signal strength, the angle of rotation relative to the true north direction, and the number of access point(s) and access point identification(s) as the positioning measurement parameters, where the angle of rotation is measured by the gyroscope of the terminal, and the access point(s) and the access point identification(s) are detected by the terminal.

Alternatively, when the scenario information of the terminal is not obtained, the positioning measurement parameter further includes at least one of the following parameters or parameter combinations: the number of carriers used by the terminal, the number of measurement access point(s) used by the terminal and signal strength, the angle of rotation relative to the true north direction, and the number of access point(s) and access point identification(s), where the angle of rotation is measured by the gyroscope of the terminal, and the access point(s) and the access point identification(s) are detected by the terminal.

It should be noted that, the server may further determine, according to service information of a terminal to be positioned, a positioning measurement parameter corresponding to the terminal, which is not limited in the present invention.

102: The server sends the measurement configuration information to the terminal through the base station.

The measurement configuration information carries the positioning measurement parameter.

Specifically, the server may be a positioning server, and may also be a Coordinator (coordinator).

If the server is the positioning server, the positioning server may directly send the measurement configuration information to the base station. After receiving the measurement configuration information, the base station does not parse the measurement configuration information, but directly forwards the measurement configuration information to the terminal to be positioned, so that the terminal performs measurement according to the positioning measurement parameter in the measurement configuration information, and returns configuration response information carrying a positioning response parameter.

The positioning response parameter is a measurement result generated after the terminal measures the positioning measurement parameter.

Further, the measurement configuration information may be measurement configuration information of LPP (LTE (Long-Term Evolution, long term evolution) Positioning Protocol, LTE positioning protocol).

In this case, the positioning server may send the positioning measurement parameter to the terminal through the base station by using eCID (enhanced cell ID, enhanced cell identification) measurement configuration signaling.

Specifically, the positioning server may add the determined positioning measurement parameter to the measurement configuration signaling of the eCID, and send measurement configuration signaling information of the eCID as the measurement configuration information to the base station, and the base station directly forwards the measurement configuration signaling information of the eCID to the terminal.

The positioning server may also directly add the positioning measurement parameter to new signaling, and send information of the newly added signaling as the measurement configuration information to the terminal through the base station.

Further, if the positioning server sends the measurement configuration information of LPP to the base station, after receiving the measurement configuration information, the base station does not parse the measurement configuration information, and directly sends the measurement configuration information to the terminal. That is, the positioning server sends the measurement configuration information to the base station, and the base station forwards the measurement configuration information to the terminal, which means that the base station transparently transmits, to the terminal, the measurement configuration information sent by the positioning server.

It should be noted that, in all embodiments of the present invention, the base station is a base station serving a terminal to be positioned by the positioning server.

Further, the measurement configuration information may also be measurement configuration information of LPPa (LTE (Long-Term Evolution, long term evolution) Positioning Protocol A, LTE positioning protocol a). The positioning server may add the positioning measurement parameter to the measurement configuration signaling information of the eCID, and send the measurement configuration signaling information of the eCID as the measurement configuration information to the base station.

The positioning server may also directly add the positioning measurement parameter to new signaling, and send information of the newly added signaling as the measurement configuration information to the base station.

Further, if the positioning server sends the measurement configuration information of LPPa to the base station, after receiving the measurement configuration information, the base station obtains, by parsing, the positioning measurement parameter carried in the measurement configuration information, generates first measurement configuration information, and sends the first measurement configuration information to a corresponding terminal. That is, after receiving the measurement configuration information sent by the server, the base station parses the received measurement configuration information, to obtain the positioning measurement parameter in the measurement configuration information, and sends first measurement configuration information to the corresponding terminal after generating the first measurement configuration information.

The first measurement configuration information is information that is generated according to the positioning measurement parameter by the base station after receiving the measurement configuration information sent by the server and obtaining the positioning measurement parameter by parsing the measurement configuration information, and that requests the terminal to measure the positioning measurement parameter. The first measurement configuration information carries the positioning measurement parameter.

If the server is the Coordinator (coordinator), the Coordinator may send the measurement configuration information to the base station, so that after receiving the measurement configuration information, the base station obtains, by parsing, the positioning measurement parameter carried in the measurement configuration information, generates first measurement configuration information, and sends the first measurement configuration information to a corresponding terminal. The measurement configuration information may also be directly sent to the terminal through the base station.

It should be noted that, the server may also be another server capable of positioning the terminal, which is not limited in the present invention.

103: The server receives, through the base station, configuration response information returned by the terminal.

The configuration response information carries the positioning response parameter. The positioning response parameter is a measurement result generated after the terminal measures the positioning measurement parameter.

Specifically, when the server directly sends the measurement configuration information to the terminal through the base station, the server receives the configuration response information that is sent by the base station, and is directly forwarded to the server by the base station without parsing after the base station receives the configuration response information sent by the terminal.

Optionally, the terminal sends the configuration response information of LPP to the base station, and the base station directly forwards the configuration response information to the server.

When the server sends the measurement configuration information to the base station, and the base station generates first measurement configuration information carrying the positioning measurement parameter after parsing the measurement configuration information, the configuration response information that is sent by the base station and received by the server is configuration response information that carries the positioning response parameter, and is generated by the base station after receiving the first configuration response information returned by the terminal and obtaining, by parsing, the positioning response parameter carried in the first configuration response information, and to be sent to the server.

Optionally, the terminal sends the first configuration response information of LPPa to the base station, and the base station parses the first configuration response information, generates the configuration response information to be sent to the server, and sends the configuration response information to the server.

104: The server positions the terminal according to the positioning response parameter carried in the configuration response information.

Specifically, before the server positions the terminal according to the positioning response parameter, the method may further include: rasterizing a network; and performing data collection (for example, a drive test (DT) or mathematical modeling manner may be used) on each raster, where each raster corresponds to a set of parameter values, and saving parameter values corresponding to all rasters in the network to the server. That is, for positioning measurement parameters of different types, parameter values corresponding to a raster are different accordingly. A parameter value corresponding to a raster may be called a positioning parameter value herein. In this case, the server saves positioning parameter values that correspond to all rasters after the network is rasterized.

Accordingly, the positioning, by the server, the terminal according to the positioning response parameter may include: comparing, by the server, the positioning response parameter with the positioning parameter values corresponding to all rasters, using a raster with a positioning parameter value closest to the positioning response parameter as a matched raster, and using a position of the matched raster as a position of the terminal.

The server compares a parameter value actually measured by a UE with the parameter values corresponding to all rasters, and uses a raster with a parameter value closest to the parameter value actually measured by the UE as the matched raster; and then, the server uses a position of the matched raster as a current position of the terminal. Then, the position information may be delivered to the UE, and certainly, another operation may also be performed.

Specific positioning processing of the server is described herein exemplarily, and a processing method in another embodiment is similar.

Further, after receiving the configuration response information, the server positions the terminal according to the positioning response parameter carried in the configuration response information. The positioning response parameter includes at least one of the following parameters or parameter combinations: measured values of a PMI/RI characteristic and the number of multiple paths of the terminal, a measurement value of a handover failure rate measured by the terminal, a measurement value of a radio link failure rate measured by the terminal, a measurement value of a signal to interference plus noise ratio of the terminal, and a measurement value of the number of cells from which the terminal receives strong interference.

Further, if the scenario information of the terminal includes: the CA scenario information, the positioning response parameter includes: the measurement value of the signal to interference plus noise ratio of the terminal, the measurement value of the number of cells from which the terminal receives strong interference, and the measured values of the PMI/RI characteristic and the number of multiple paths of the terminal; or, if the scenario information of the terminal includes: the CoMP scenario information, the positioning response parameter includes: the measurement value of the signal to interference plus noise ratio of the terminal, the measurement value of the number of cells from which the terminal receives strong interference, and the measured values of the PMI/RI characteristic and the number of multiple paths of the terminal; or, if the scenario information of the terminal includes: the MDT scenario information, the positioning response parameter includes: the measurement value of the handover failure rate measured by the terminal, and the measurement value of the radio link failure rate measured by the terminal; or, if the scenario information of the terminal includes the WAN or WiFi scenario information, the positioning response parameter includes at least one of the following parameters or parameter combinations: the measured values of the precoding matrix indicator PMI/rank indicator RI characteristic and the number of multiple paths of the terminal, the measurement value of the handover failure rate measured by the terminal, the measurement value of the radio link failure rate measured by the terminal, the measurement value of the signal to interference plus noise ratio of the terminal, and the measurement value of the number of cells from which the terminal receives strong interference.

Further, if the scenario information of the terminal includes: the CA scenario information, the positioning response parameter further includes: a measurement value of the number of carriers used by the terminal, and a measurement value of an angle of rotation relative to a true north direction, where the angle of rotation is measured by a gyroscope of the terminal; or, if the scenario information of the terminal includes: the CoMP scenario information, the positioning response parameter further includes: measured values of the number of measurement access point(s) used by the terminal and signal strength, and a measurement value of an angle of rotation relative to a true north direction, where the angle of rotation is measured by a gyroscope of the terminal; or, if the scenario information of the terminal includes: the WAN or WiFi scenario information, the positioning response parameter further includes: measured values of the number of access point(s) and access point identification(s), where the access point(s) and the access point identification(s) are detected by the terminal; or, if the scenario information of the terminal includes: the MDT scenario information, the positioning response parameter includes: a measurement value of the number of carriers used by the terminal, measured values of the number of measurement access point(s) used by the terminal and signal strength, a measurement value of an angle of rotation relative to a true north direction, and measured values of the number of access point(s) and access point identification(s), where the angle of rotation is measured by a gyroscope of the terminal, and the access point(s) and the access point identification(s) are detected by the terminal.

Alternatively, when the scenario information of the terminal is not obtained, the positioning response parameter further includes at least one of the following parameters or parameter combinations: a measurement value of the number of carriers used by the terminal, measured values of the number of measurement access point(s) used by the terminal and signal strength, a measurement value of an angle of rotation relative to a true north direction, and measured values of the number of access point(s) and access point identification(s), where the angle of rotation is measured by a gyroscope of the terminal, and the access point(s) and the access point identification(s) are detected by the terminal.

A specific positioning response parameter of the terminal is described herein exemplarily, and a positioning response parameter in another embodiment is similar.

The embodiment of the present invention provides a positioning method, where a server sends measurement configuration information carrying a positioning measurement parameter, so that a terminal performs measurement according to the positioning measurement parameter, to obtain a positioning response parameter; and when receiving configuration response information carrying the positioning response parameter, the server positions the terminal according to the positioning response parameter. In this way, the server positions the terminal according to at least one parameter of the terminal related to a position of the terminal, which can position the position of the terminal more accurately, thereby improving the positioning precision.

Figure 2:
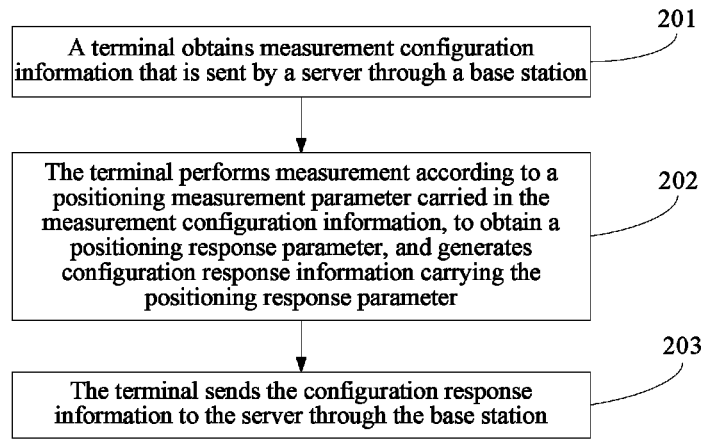
FIG. 2 is a schematic diagram of another positioning method according to an embodiment of the present invention.

An embodiment of the present invention provides a positioning method. As shown in FIG. 2, the method includes:

201: A terminal obtains measurement configuration information that is sent by a server through a base station.

The measurement configuration information carries a positioning measurement parameter. The positioning measurement parameter is a parameter that the server requests the terminal to measure and is used to position the terminal. The positioning measurement parameter includes at least one of the following parameters or parameter combinations:

a precoding matrix indicator PMI/rank indicator RI characteristic and the number of multiple paths of the terminal, a handover failure rate measured by the terminal, a radio link failure rate measured by the terminal, a signal to interference plus noise ratio of the terminal, and the number of cells from which the terminal receives strong interference.

Further, if scenario information of the terminal includes: carrier aggregation CA scenario information, the positioning measurement parameter includes: the signal to interference plus noise ratio of the terminal, the number of cells from which the terminal receives strong interference, and the PMI/RI characteristic and the number of multiple paths of the terminal; or, if scenario information of the terminal includes: coordinated multi-point CoMP scenario information, the positioning measurement parameter includes: the signal to interference plus noise ratio of the terminal, the number of cells from which the terminal receives strong interference, and the PMI/RI characteristic and the number of multiple paths of the terminal; or, if scenario information of the terminal includes: minimization of drive tests MDT scenario information, the positioning measurement parameter includes: the handover failure rate measured by the terminal and the radio link failure rate measured by the terminal.

Furthermore, if the scenario information of the terminal includes: the CA scenario information, the positioning measurement parameter further includes: the number of carriers used by the terminal and an angle of rotation relative to a true north direction, where the angle of rotation is measured by a gyroscope of the terminal; or, if the scenario information of the terminal includes: the CoMP scenario information, the positioning measurement parameter further includes: the number of measurement access point(s) used by the terminal and signal strength, and an angle of rotation relative to a true north direction, where the angle of rotation is measured by a gyroscope of the terminal; or, if the scenario information of the terminal includes: wide area network WAN or wireless fidelity WiFi scenario information, the positioning measurement parameter further includes: the number of access point(s) and access point identification(s), where the access point(s) and the access point identification(s) are detected by the terminal.

Alternatively, when the server does not obtain the scenario information of the terminal, the positioning measurement parameter further includes at least one of the following parameters or parameter combinations: the number of carriers used by the terminal, the number of measurement access point(s) used by the terminal and signal strength, an angle of rotation relative to a true north direction, and the number of access point(s) and access point identification(s), where the angle of rotation is measured by a gyroscope of the terminal, and the access point(s) and the access point identification(s) are detected by the terminal.

Specifically, the terminal may receive the measurement configuration information that is sent by the server and forwarded by the base station. In this case, the base station does not parse the measurement configuration information after receiving the measurement configuration information sent by the server, and directly forwards the measurement configuration information to the terminal. That means, the measurement configuration information received by the terminal is the measurement configuration information sent by the server.

Alternatively, the terminal may also receive first measurement configuration information that is generated by the base station according to the measurement configuration information sent by the server. In this case, after receiving the measurement configuration information sent by the server, the base station generates the first measurement configuration information, and sends the first measurement configuration information to the terminal, and the terminal receives the first measurement configuration information. In this case, the measurement configuration information includes the first measurement configuration information. The first measurement configuration information carries the positioning measurement parameter.

It should be noted that, the first measurement configuration information may be the same as or different from the measurement configuration information sent by the server. For example, the base station may add, to the measurement configuration information sent by the server, information of a specific implementation manner used when the terminal measures the positioning measurement parameter, for example, information about whether the terminal returns the configuration response information to the base station periodically, or returns the configuration response information to the base station suddenly.

It should be noted that, returning the configuration response information to the base station suddenly refers to that the terminal returns the configuration response information to the base station only when the measurement configuration information is received, and the terminal does not return the configuration response information to the base station when no measurement configuration information is received.

202: The terminal performs measurement according to the positioning measurement parameter carried in the measurement configuration information, to obtain a positioning response parameter, and generates configuration response information carrying the positioning response parameter.

The positioning response parameter is a measurement result generated after the terminal measures the positioning measurement parameter.

Specifically, after receiving the measurement configuration information, the terminal performs measurement according to the positioning measurement parameter carried in the measurement configuration information, uses, as the positioning response parameter, a measured result that is of the positioning measurement parameter and is required for positioning by the server, and generates corresponding configuration response information according to the received measurement configuration information.

It should be noted that, the positioning response parameter returned by the terminal is the same as the positioning response parameter carried in the configuration response information that is received by the server through the base station, which is not further described herein.

203: The terminal sends the configuration response information to the server through the base station, where the configuration response information carries the positioning response parameter, so that the server positions the terminal according to the positioning response parameter.

Specifically, after obtaining the positioning response parameter, the terminal adds the positioning response parameter to the configuration response information. If the measurement configuration information received by the terminal in step 201 is measurement configuration information that is sent by the server and is not parsed by the base station, the terminal adds the positioning response parameter to the configuration response information, and forwards it to the server through the base station.

Further, the terminal receives the measurement configuration information sent by the base station, and then the terminal may add the positioning response parameter to measurement configuration reporting signaling of an eCID of LPP, and sends information of the measurement configuration reporting signaling of the eCID as the configuration response information to the server through the base station. The terminal may also add new reporting signaling of LPP, add the positioning response parameter to the newly added reporting signaling, and send information of the newly added reporting signaling as the configuration response information to the server through the base station.

If the measurement configuration information received by the terminal in step 201 is the first measurement configuration information sent by the base station, it indicates that the base station parses the measurement configuration information after receiving the measurement configuration information sent by the server, and generates the first measurement configuration information. In this case, the terminal adds the positioning response parameter to first configuration response information. The terminal sends the first configuration response information to the base station, so that after receiving the first configuration response information, the base station generates configuration response information sent to the server, and sends the configuration response information to the server, where the configuration response information carries the positioning response parameter.

Further, the terminal may add the positioning response parameter to configuration response reporting signaling of the eCID, and send the configuration response reporting signaling as the first configuration response information to the base station. Alternatively, the terminal may add the positioning response parameter to new reporting signaling, and sends the reporting signaling as the first configuration response information to the base station.

The embodiment of the present invention provides a positioning method, where a terminal receives measurement configuration information carrying a positioning measurement parameter, and performs measurement according to the positioning measurement parameter, to obtain a positioning response parameter; and the terminal adds the positioning response parameter to configuration response information, and sends the configuration response information to a server through a base station, so that the server positions the terminal according to the positioning response parameter when receiving the configuration response information carrying the positioning response parameter. In this way, the server can position the terminal according to at least one parameter of the terminal related to a position of the terminal, which can position the terminal more accurately, thereby improving the positioning precision.

Figure 3:
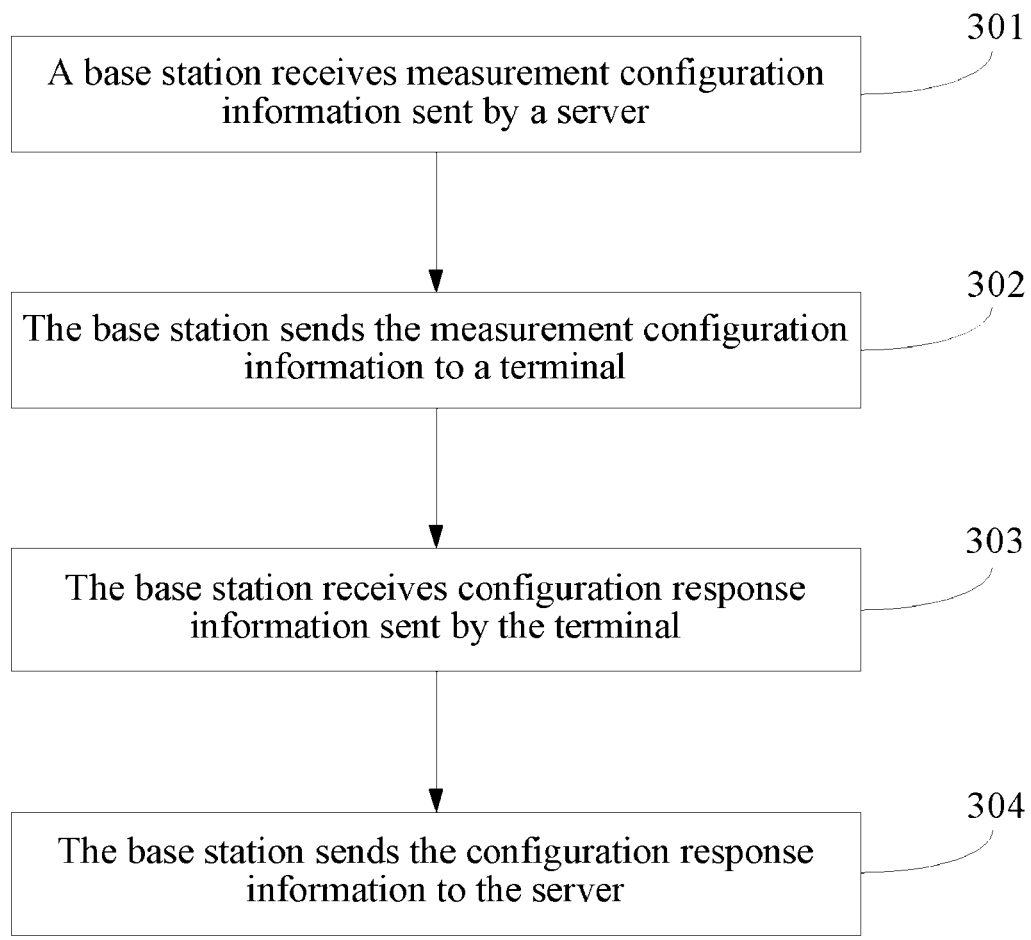
FIG. 3 is a schematic diagram of another positioning method according to an embodiment of the present invention.

An embodiment of the present invention provides a positioning method. As shown in FIG. 3, the method includes:

301: A base station receives measurement configuration information sent by a server.

The measurement configuration information carries a positioning measurement parameter. The positioning measurement parameter is a parameter that the server requests a terminal to measure and is used to position the terminal. The positioning measurement parameter may include at least one of the following parameters or parameter combinations:

a precoding matrix indicator PMI/rank indicator RI characteristic and the number of multiple paths of the terminal, a handover failure rate measured by the terminal, a radio link failure rate measured by the terminal, a signal to interference plus noise ratio of the terminal, and the number of cells from which the terminal receives strong interference.

Further, if scenario information of the terminal includes: carrier aggregation CA scenario information, the positioning measurement parameter includes: the signal to interference plus noise ratio of the terminal, the number of cells from which the terminal receives strong interference, and the PMI/RI characteristic and the number of multiple paths of the terminal. Or, if scenario information of the terminal includes: coordinated multi-point CoMP scenario information, the positioning measurement parameter includes: the signal to interference plus noise ratio of the terminal, the number of cells from which the terminal receives strong interference, and the PMI/RI characteristic and the number of multiple paths of the terminal. Or, if scenario information of the terminal includes: minimization of drive tests MDT scenario information, the positioning measurement parameter includes: the handover failure rate measured by the terminal and the radio link failure rate measured by the terminal. Or, if scenario information of the terminal includes: WiFi (Wireless Fidelity, wireless fidelity) or WAN (Wide Area Network, wide area network) scenario information, the positioning measurement parameter includes at least one of the following parameters or parameter combinations: the precoding matrix indicator PMI/rank indicator RI and the number of multiple paths of the terminal, the handover failure rate measured by the terminal, the radio link failure rate measured by the terminal, the signal to interference plus noise ratio of the terminal, and the number of cells from which the terminal receives strong interference.

Furthermore, if the scenario information of the terminal includes: the CA scenario information, the positioning measurement parameter further includes: the number of carriers used by the terminal and an angle of rotation relative to a true north direction, where the angle of rotation is measured by a gyroscope of the terminal. Or, if the scenario information of the terminal includes: the CoMP scenario information, the positioning measurement parameter further includes: the number of measurement access point(s) used by the terminal and signal strength, and an angle of rotation relative to a true north direction, where the angle of rotation is measured by a gyroscope of the terminal. Or, if the scenario information of the terminal includes: the wide area network WAN or wireless fidelity WiFi scenario information, the positioning measurement parameter further includes: the number of access point(s) and access point identification(s), where the access point(s) and the access point identification(s) are detected by the terminal. Or, if the scenario information of the terminal includes: the MDT scenario information, the positioning measurement parameter further includes the number of carriers used by the terminal, the number of measurement access point(s) used by the terminal and signal strength, an angle of rotation relative to a true north direction, and the number of access point(s) and access point identification(s), where the angle of rotation is measured by a gyroscope of the terminal, and the access point(s) and the access point identification(s) are detected by the terminal.

Alternatively, when the server does not obtain the scenario information of the terminal, the positioning measurement parameter further includes at least one of the following parameters or parameter combinations: the number of carriers used by the terminal, the number of measurement access point(s) used by the terminal and signal strength, an angle of rotation relative to a true north direction, and the number of access point(s) and access point identification(s), where the angle of rotation is measured by a gyroscope of the terminal, and the access point(s) and the access point identification(s) are detected by the terminal.

Optionally, the base station may receive measurement configuration information sent by a positioning server, and may also receive measurement configuration information sent by a Coordinator.

302: The base station sends the measurement configuration information to the terminal.

Specifically, if the base station cannot parse the measurement configuration information that is sent by the server to the base station, the base station directly sends the measurement configuration information to the terminal. For example, the server sends measurement configuration information of LPP to the base station, and in this case, the base station cannot parse the measurement configuration information, and accordingly, the base station directly forwards the measurement configuration information to the terminal after receiving the measurement configuration information.

Further, the base station may know, through the server, which terminal served by the base station needs to be positioned by the server.

If the base station can parse the measurement configuration information sent by the server to the base station, the base station parses the measurement configuration information, to obtain the positioning measurement parameter. The base station generates first measurement configuration information, adds the positioning measurement parameter to the first measurement configuration information, and sends the first measurement configuration information to the terminal.

Specifically, if the base station can parse the measurement configuration information sent by the server, the base station needs to parse the measurement configuration information to obtain the positioning measurement parameter carried in the measurement configuration information, generate the first measurement configuration information to be sent to the terminal, and send the first measurement configuration information to the terminal. For example, the server sends measurement configuration information of LPPa to the base station; and after receiving the measurement configuration information, the base station parses the measurement configuration information, to obtain the positioning measurement parameter in the measurement configuration information, generates the first measurement configuration information to be sent to the terminal, adds the positioning measurement parameter to the first measurement configuration information, and sends the first measurement configuration information to the terminal.

Further, the base station may add the positioning measurement parameter to measurement signaling, and send information of the measurement signaling as the first measurement configuration information to the terminal.

Furthermore, when obtaining the positioning measurement parameter by parsing, the base station can know which terminal served by the base station needs to be positioned by the server.

303: The base station receives configuration response information sent by the terminal.

The configuration response information carries a positioning response parameter. The positioning response parameter is a measurement result generated after the terminal measures the positioning measurement parameter.

Specifically, if in step 302, the base station does not parse the measurement configuration information sent by the server, and directly forwards the measurement configuration information to the terminal, after obtaining the positioning response parameter, the terminal generates configuration response information in a same format as the measurement configuration information, adds the positioning response parameter to the configuration response information, and sends the positioning response parameter to the base station. After receiving the configuration response information, the base station does not parse the configuration response information, and directly forwards the configuration response information to the server.

If in step 302, the base station parses the measurement configuration information sent by the server, and sends the first measurement configuration information to the terminal, the base station receives first configuration response information sent by the terminal, where the first configuration response information carries the positioning response parameter. The base station parses the first configuration response information, to obtain the positioning response parameter. The base station generates configuration response information to be sent to the server, and adds the positioning response parameter to the configuration response information.

It should be noted that, the positioning response parameter returned by the terminal is the same as the positioning response parameter carried in the configuration response information that is received by the server through the base station, which is not further described herein.

304: The base station sends the configuration response information to the server.

Specifically, the base station sends the server the configuration response information that is generated and is to be sent to the server. Alternatively, the base station forwards, to the server, configuration response information that is received from the terminal.

Further, the base station may add the positioning response parameter to configuration response reporting signaling of an eCID, and the base station sends the configuration response reporting signaling of the eCID as the configuration response information to the server. The base station may also add the positioning response parameter to newly added reporting signaling, and sends information of the newly added reporting signaling as the configuration response information to the server.

The embodiment of the present invention provides a positioning method, where after receiving measurement configuration information sent by a server, if a base station cannot parse the measurement configuration information, the base station directly sends the measurement configuration information to a terminal; or if the base station can parse the measurement configuration information, the base station obtains, by parsing, a positioning measurement parameter carried in the measurement configuration information, adds the positioning measurement parameter to first measurement configuration information, and sends the first measurement configuration information to the terminal, so that the terminal receives the first measurement configuration information carrying the positioning measurement parameter, and performs measurement according to the positioning measurement parameter, to obtain a positioning response parameter; and the base station sends obtained configuration response information to the server, so that the server positions the terminal according to the positioning response parameter when receiving the configuration response information carrying the positioning response parameter. In this way, the server can position the terminal according to at least one parameter of the terminal related to a position of the terminal, which can position the terminal more accurately, thereby improving the positioning precision.

Figure 4:
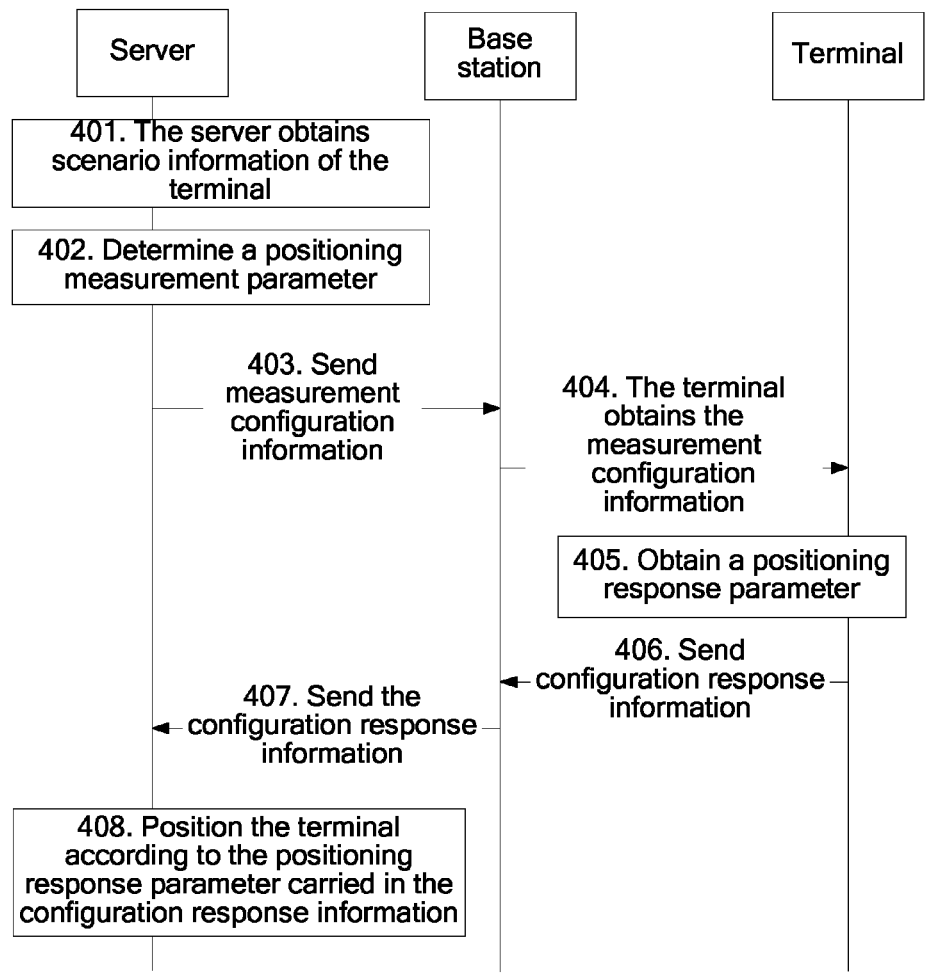
FIG. 4 is a schematic diagram of another positioning method according to an embodiment of the present invention.

An embodiment of the present invention provides a positioning method. As shown in FIG. 4, the method includes:

401: The server obtains scenario information of the terminal.

Specifically, a method of obtaining, by the server, the scenario information of the terminal may be: sending, by the server, a request message for obtaining the scenario information of the terminal to a base station, and obtaining the scenario information of the terminal from a response message fed back by the base station.

If the server sends a request message of LPPa to the base station, after the base station receives the request message, when the base station has obtained the scenario information of the terminal, the base station sends the obtained scenario information of the terminal to the server; or in a case in which the base station does not obtain the scenario information of the terminal, the base station may send the request message to the terminal, so that the terminal returns response information carrying the scenario information, and the base station sends the response information carrying the scenario information to the server.

If the server sends a request message of LPP to the base station, after receiving the request message, the base station directly sends the message to the terminal. After receiving response information of the scenario information of the terminal, the base station directly sends the response information to the server.

It should be noted that, an implementation solution in which the server sends a request message of LPPa or LPP is similar to the solution in the foregoing embodiments, and details are not further described herein. In addition, the server may also obtain the scenario information of the terminal by using another method, which is not limited in the present invention.

402 is the same as step 101, and is not further described herein.

403: The server sends measurement configuration information to the base station. The base station receives the measurement configuration information.

Specifically, for the sending, by the server, measurement configuration information to the base station, reference may be made to step 102, for the receiving, by the base station, the measurement configuration information, reference may be made to step 301. Details are not further described herein.

404: The base station sends the measurement configuration information to the terminal, and the terminal obtains the measurement configuration information.

Specifically, for the sending, by the base station, the measurement configuration information to the terminal, reference may be made to step 302, and for the obtaining, by the terminal, the measurement configuration information, reference may be made to step 201. Details are not further described herein.

405 is the same as step 202, and is not further described herein.

406: The terminal sends second configuration response information to the base station, and the base station receives the second configuration response information.

Specifically, for the sending, by the terminal, configuration response information to the base station, reference may be made to step 203, and for the receiving, by the base station, the configuration response information, reference may be made to step 303. Details are not further described herein.

407: The base station sends first configuration response information to the server, and the server receives the configuration response information that is returned by the terminal and sent by the base station.

Specifically, for the sending, by the base station, the first configuration response information to the server, reference may be made to step 304, and for the receiving, by the server, the first configuration response information, reference may be made to step 103. Details are not further described herein.

408 is the same as step 104, and is not further described herein.

The embodiment of the present invention provides a positioning method, where a server sends measurement configuration information carrying a positioning measurement parameter to a base station; after receiving the measurement configuration information carrying the positioning measurement parameter, if the measurement configuration information sent by the server can be parsed, the base station obtains the positioning measurement parameter by parsing, adds the positioning measurement parameter to first measurement configuration information, and sends the first measurement configuration information to the terminal; if the measurement configuration information sent by the server cannot be parsed, the base station forwards the measurement configuration information to the terminal, so that after receiving the measurement configuration information, the terminal performs measurement according to the positioning measurement parameter, to obtain a positioning response parameter, adds the positioning response parameter to configuration response information, and sends the configuration response information to the base station; the base station sends the configuration response information to the server; and when receiving first configuration response information carrying the positioning response parameter, the server positions the terminal according to the positioning response parameter. In this way, the server can position the terminal according to at least one parameter of the terminal related to a position of the terminal, which can position the terminal more accurately, thereby improving the positioning precision.

Figure 5:
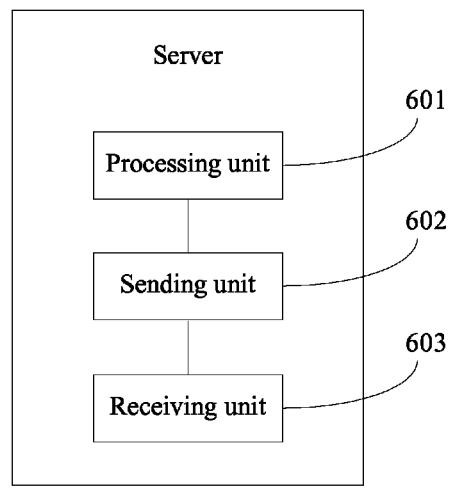
FIG. 5 is a schematic structural diagram of a server according to an embodiment of the present invention.

An embodiment of the present invention provides a server. As shown in FIG. 5, the server includes: a processing unit 601, a sending unit 602, and a receiving unit 603.

The processing unit 601 is configured to determine a positioning measurement parameter, generate measurement configuration information carrying the positioning measurement parameter, and send the measurement configuration information to a terminal by using the sending unit 602.

The positioning measurement parameter is a parameter that the server requests a terminal to measure and is used to position the terminal. The positioning measurement parameter includes at least one of the following parameters or parameter combinations: a precoding matrix indicator PMI/rank indicator RI characteristic and the number of multiple paths of the terminal, a handover failure rate measured by the terminal, a radio link failure rate measured by the terminal, a signal to interference plus noise ratio of the terminal, and the number of cells from which the terminal receives strong interference.

Further, the processing unit 601 is further configured to send a request message for obtaining scenario information of the terminal to the base station, and obtain the scenario information of the terminal from a response message fed back by the base station.

In this case, the processing unit 601 being configured to determine a positioning measurement parameter includes: determining the positioning measurement parameter according to the obtained scenario information of the terminal.

Specifically, the processing unit 601 being configured to determine the positioning measurement parameter according to the obtained scenario information of the terminal includes at least one of the following: if the scenario information of the terminal includes: carrier aggregation CA scenario information, determining the signal to interference plus noise ratio of the terminal, the number of cells from which the terminal receives strong interference, and the PMI/RI characteristic and the number of multiple paths of the terminal as the positioning measurement parameters;

if the scenario information of the terminal includes: coordinated multi-point CoMP scenario information, determining the signal to interference plus noise ratio of the terminal, the number of cells from which the terminal receives strong interference, and the PMI/RI characteristic and the number of multiple paths of the terminal as the positioning measurement parameters;

if the scenario information of the terminal includes: minimization of drive tests MDT scenario information, determining the handover failure rate measured by the terminal and the radio link failure rate measured by the terminal as the positioning measurement parameters; and if the scenario information of the terminal includes: wireless fidelity WiFi or wide area network WAN scenario information, determining at least one of the following parameters or parameter combinations as the positioning measurement parameter: the precoding matrix indicator PMI/rank indicator RI and the number of multiple paths of the terminal, the handover failure rate measured by the terminal, the radio link failure rate measured by the terminal, the signal to interference plus noise ratio of the terminal, and the number of cells from which the terminal receives strong interference.

Further, the processing unit 601 being configured to determine the positioning measurement parameter according to the obtained scenario information of the terminal includes at least one of the following: if the scenario information of the terminal includes: the CA scenario information, further determining the number of carriers used by the terminal and an angle of rotation relative to a true north direction as the positioning measurement parameters, where the angle of rotation is measured by a gyroscope of the terminal;

if the scenario information of the terminal includes: the CoMP scenario information, further determining the number of measurement access point(s) used by the terminal and signal strength, and the angle of rotation relative to the true north direction as the positioning measurement parameters, where the angle of rotation is measured by the gyroscope of the terminal;

if the scenario information of the terminal includes: the wide area network WAN or wireless fidelity WiFi scenario information, further determining the number of access point(s) and access point identification(s) as the positioning measurement parameters, where the access point(s) and the access point identification(s) are detected by the terminal; and if the scenario information of the terminal includes: the MDT scenario information, further determining the number of carriers used by the terminal, the number of measurement access point(s) used by the terminal and signal strength, the angle of rotation relative to the true north direction, and the number of access point(s) and access point identification(s) as the positioning measurement parameters, where the angle of rotation is measured by the gyroscope of the terminal, and the access point(s) and the access point identification(s) are detected by the terminal;

Alternatively, when the server does not obtain the scenario information of the terminal, the positioning measurement parameter further includes at least one of the following parameters or parameter combinations: the number of carriers used by the terminal, the number of measurement access point(s) used by the terminal and signal strength, an angle of rotation relative to a true north direction, and the number of access point(s) and access point identification(s), where the angle of rotation is measured by a gyroscope of the terminal, and the access point(s) and the access point identification(s) are detected by the terminal.

It should be noted that, in all embodiments of the present invention, the positioning measurement parameter is a positioning measurement parameter that is determined and sent by the server in the embodiment of the present invention, which is not further described herein.

The sending unit 602 is configured to send the measurement configuration information generated by the processing unit 601 to the terminal through a base station.

The first measurement configuration information carries the positioning measurement parameter.

Specifically, the sending unit 602 is specifically configured to send the measurement configuration information to the base station, so that after receiving the measurement configuration information, the base station generates first measurement configuration information, and sends the first measurement configuration information to a corresponding terminal.

The first measurement configuration information is information that is generated according to the positioning measurement parameter by the base station after receiving the measurement configuration information sent by the server and obtaining the positioning measurement parameter by parsing the measurement configuration information, and that requests the terminal to measure the positioning measurement parameter. The first measurement configuration information carries the positioning measurement parameter.

The receiving unit 603 is configured to receive, through the base station, configuration response information returned by the terminal.

The configuration response information carries a positioning response parameter. The positioning response parameter is a measurement result generated after the terminal measures the positioning measurement parameter.

The processing unit 601 is further configured to position the terminal according to the positioning response parameter carried in the configuration response information received by the receiving unit 603.

The processing unit 601 is further configured to save positioning parameter values that correspond to all rasters after a network is rasterized.

In this case, the processing unit 601 being configured to position the terminal according to the positioning response parameter carried in the configuration response information received by the receiving unit includes: comparing the positioning response parameter with the positioning parameter values that correspond to all rasters after a network is rasterized, using a raster with a positioning parameter value closest to the positioning response parameter as a matched raster, and using a position of the matched raster as a position of the terminal.

The embodiment of the present invention provides a server, where the server sends measurement configuration information carrying a positioning measurement parameter, so that a terminal performs measurement according to the positioning measurement parameter, to obtain a positioning response parameter; and when receiving configuration response information carrying the positioning response parameter, the server positions the terminal according to the positioning response parameter. In this way, the server positions the terminal according to at least one parameter of the terminal related to a position of the terminal, which can position the terminal more accurately, thereby improving the positioning precision.

Figure 6:
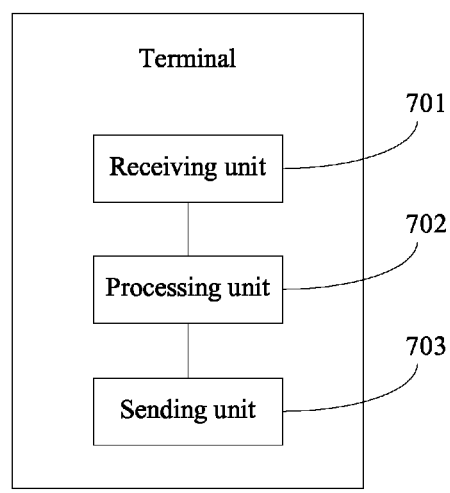
FIG. 6 is a schematic structural diagram of a terminal according to an embodiment of the present invention.

An embodiment of the present invention provides a terminal. As shown in FIG. 6, the terminal includes: a receiving unit 701, a processing unit 702, and a sending unit 703.

The receiving unit 701 is configured to obtain measurement configuration information that is sent by a server through a base station.

The measurement configuration information carries a positioning measurement parameter. The positioning measurement parameter is a parameter that the server requests a terminal to measure and is used to position the terminal. The positioning measurement parameter includes at least one of the following parameters or parameter combinations:

a precoding matrix indicator PMI/rank indicator RI characteristic and the number of multiple paths of the terminal, a handover failure rate measured by the terminal, a radio link failure rate measured by the terminal, a signal to interference plus noise ratio of the terminal, and the number of cells from which the terminal receives strong interference.

It should be noted that, the positioning measurement parameter received by the terminal is the same as the positioning measurement parameter determined and sent by the server, which is not further described herein.

Specifically, when the measurement configuration information includes first measurement configuration information, the receiving unit 701 is specifically configured to receive the first measurement configuration information sent by the base station.

The first measurement configuration information is information that is generated according to the positioning measurement parameter by the base station after receiving the measurement configuration information sent by the server and obtaining the positioning measurement parameter by parsing the measurement configuration information, and that requests the terminal to measure the positioning measurement parameter. The first measurement configuration information carries the positioning measurement parameter.

The processing unit 702 is configured to perform measurement according to the positioning measurement parameter carried in the measurement configuration information received by the receiving unit, to obtain a positioning response parameter, and generate configuration response information carrying the positioning response parameter.

The positioning response parameter is a measurement result generated after the terminal measures the positioning measurement parameter.

The sending unit 703 is configured to send the configuration response information generated by the processing unit 702 to the terminal through a base station.

The configuration response information carries the positioning response parameter.

Specifically, if the receiving unit 701 receives the first measurement configuration information sent by the base station, the configuration response information includes first configuration response information.

The sending unit 703 is specifically configured to send the first configuration response information to the base station, so that after receiving the first configuration response information, the base station generates configuration response information to be sent to the server, and sends the configuration response information to the server.

The configuration response information carries the positioning response parameter.

The embodiment of the present invention provides a terminal, where the terminal receives measurement configuration information carrying a positioning measurement parameter, and performs measurement according to the positioning measurement parameter, to obtain a positioning response parameter; and the terminal adds the positioning response parameter to configuration response information, and sends the configuration response information to a server through a base station, so that the server positions the terminal according to the positioning response parameter when receiving the configuration response information carrying the positioning response parameter. In this way, the server can position the terminal according to at least one parameter of the terminal related to a position of the terminal, which can position the terminal more accurately, thereby improving the positioning precision.

Figure 7:
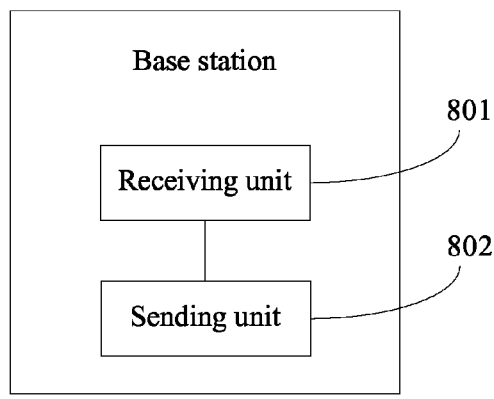
FIG. 7 is a schematic structural diagram of a base station according to an embodiment of the present invention.

An embodiment of the present invention provides a base station. As shown in FIG. 7, the base station includes: a receiving unit 801 and a sending unit 802.

The receiving unit 801 is configured to receive measurement configuration information sent by a server.

The measurement configuration information carries a positioning measurement parameter.

The positioning measurement parameter is a parameter that the server requests a terminal to measure and is used to position the terminal. The positioning measurement parameter includes at least one of the following parameters or parameter combinations:

a precoding matrix indicator PMI/rank indicator RI characteristic and the number of multiple paths of the terminal, a handover failure rate measured by the terminal, a radio link failure rate measured by the terminal, a signal to interference plus noise ratio of the terminal, and the number of cells from which the terminal receives strong interference.

It should be noted that, the positioning measurement parameter received by the base station is the same as the positioning measurement parameter determined and sent by the server, which is not further described herein.

The sending unit 802 is configured to send the measurement configuration information received by the receiving unit 801 to the terminal.

The receiving unit 801 is further configured to receive configuration response information sent by the terminal, where the configuration response information carries a positioning response parameter.

The positioning response parameter is a measurement result generated after the terminal measures the positioning measurement parameter.

The sending unit 802 is further configured to send the configuration response information received by the receiving unit 801 to the server.

Figure 8:
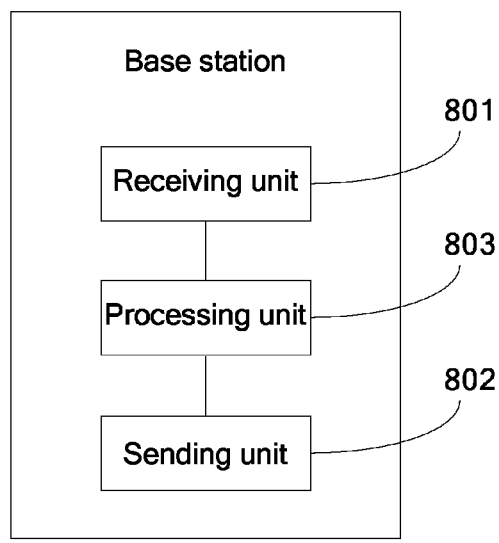
FIG. 8 is a schematic structural diagram of another base station according to an embodiment of the present invention.

As shown in FIG. 8, the base station further includes:

a processing unit 803, configured to parse the measurement configuration information received by the receiving unit 801, to obtain the positioning measurement parameter.

The processing unit 803 is further configured to generate first measurement configuration information, and add the positioning measurement parameter to the first measurement configuration information.

In this case, the sending unit 802 being configured to send the measurement configuration information received by the receiving unit to the terminal includes: sending the first measurement configuration information generated by the processing unit 803 to the terminal.

Further, the receiving unit 801 being configured to receive configuration response information sent by the terminal includes: receiving first configuration response information sent by the terminal, where the first configuration response information carries the positioning response parameter.

The processing unit 803 is further configured to parse the first configuration response information received by the receiving unit 801, to obtain the positioning response parameter.

The processing unit 803 is further configured to generate configuration response information to be sent to the server, and add the positioning response parameter to the configuration response information.

In this case, the sending unit 802 being configured to send the configuration response information received by the receiving unit to the server includes: sending the configuration response information generated by the processing unit 803 to the server.

The embodiment of the present invention provides a base station and a positioning method, where after receiving measurement configuration information sent by a server, if the base station cannot parse the measurement configuration information, the base station directly sends the measurement configuration information to a terminal; if the base station can parse the measurement configuration information, the base station obtains, by parsing, a positioning measurement parameter carried in the measurement configuration information, adds the positioning measurement parameter to first measurement configuration information, and sends the first measurement configuration information to the terminal, so that the terminal receives the first measurement configuration information carrying the positioning measurement parameter, and performs measurement according to the positioning measurement parameter, to obtain a positioning response parameter; and the base station sends obtained configuration response information to the server, so that the server positions the terminal according to the positioning response parameter when receiving the configuration response information carrying the positioning response parameter. In this way, the server can position the terminal according to at least one parameter of the terminal related to a position of the terminal, which can position the terminal more accurately, thereby improving the positioning precision.

Figure 9:
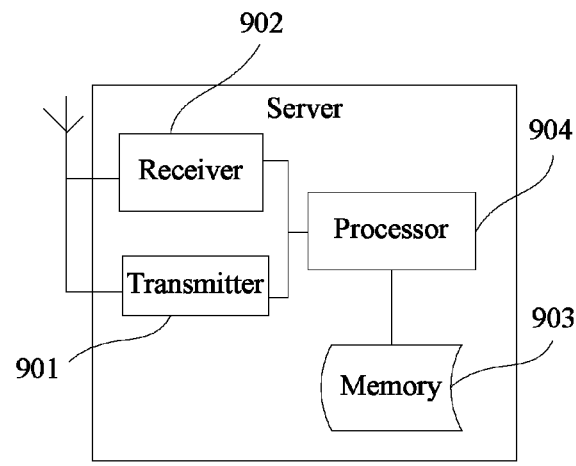
FIG. 9 is a schematic structural diagram of another server according to an embodiment of the present invention.

An embodiment of the present invention provides a server. As shown in FIG. 9, the server includes a transmitter 901, a receiver 902, a memory 903, and a processor 904 respectively connected to the transmitter 901, the receiver 902, and the memory 903.

The memory 903 stores a group of program code, and the processor 904 is configured to invoke the program code stored in the memory 903 to execute the following operations.

The processor 904 is configured to determine a positioning measurement parameter, generate measurement configuration information carrying the positioning measurement parameter, and send the measurement configuration information to a terminal through the transmitter 901.

The positioning measurement parameter is a parameter that the server requests a terminal to measure and is used to position the terminal. The positioning measurement parameter includes at least one of the following parameters or parameter combinations: a precoding matrix indicator PMI/rank indicator RI characteristic and the number of multiple paths of the terminal, a handover failure rate measured by the terminal, a radio link failure rate measured by the terminal, a signal to interference plus noise ratio of the terminal, and the number of cells from which the terminal receives strong interference.

It should be noted that the possible implementations in which the processor 904 determines the positioning measurement parameter are the same as the implementations in which the server determines the positioning measurement parameter in the foregoing embodiment, which are not further described herein.

Further, the processor 904 is further configured to send a request message for obtaining scenario information of the terminal to the base station, and obtain the scenario information of the terminal from a response message fed back by the base station.

In this case, the processor 904 being configured to determine a positioning measurement parameter includes: determining the positioning measurement parameter according to the obtained scenario information of the terminal.

The transmitter 901 is configured to send the measurement configuration information to the terminal through the base station.

The first measurement configuration information carries the positioning measurement parameter.

Specifically, the transmitter 901 is specifically configured to send the measurement configuration information to the base station, so that after receiving the measurement configuration information, the base station generates first measurement configuration information, and sends the first measurement configuration information to a corresponding terminal.

The first measurement configuration information is information that is generated according to the positioning measurement parameter by the base station after receiving the measurement configuration information sent by the server and obtaining the positioning measurement parameter by parsing the measurement configuration information, and that requests the terminal to measure the positioning measurement parameter. The first measurement configuration information carries the positioning measurement parameter.

The receiver 902 is configured to receive, through the base station, configuration response information returned by the terminal.

The configuration response information carries a positioning response parameter. The positioning response parameter is a measurement result generated after the terminal measures the positioning measurement parameter.

The processor 904 is further configured to position the terminal according to the positioning response parameter carried in the configuration response information.

The processor 904 is further configured to save positioning parameter values that correspond to all rasters after a network is rasterized.

In this case, the processor 904 being configured to position the terminal according to the positioning response parameter carried in the configuration response information received by the receiver includes: comparing the positioning response parameter with the positioning parameter values that correspond to all rasters after a network is rasterized, using a raster with a positioning parameter value closest to the positioning response parameter as a matched raster, and using a position of the matched raster as a position of the terminal.

The embodiment of the present invention provides a server, where the server sends measurement configuration information carrying a positioning measurement parameter, so that a terminal performs measurement according to the positioning measurement parameter, to obtain a positioning response parameter; and when receiving configuration response information carrying the positioning response parameter, the server positions the terminal according to the positioning response parameter. In this way, the server positions the terminal according to at least one parameter of the terminal related to a position of the terminal, which can position the terminal more accurately, thereby improving the positioning precision.

Figure 10:
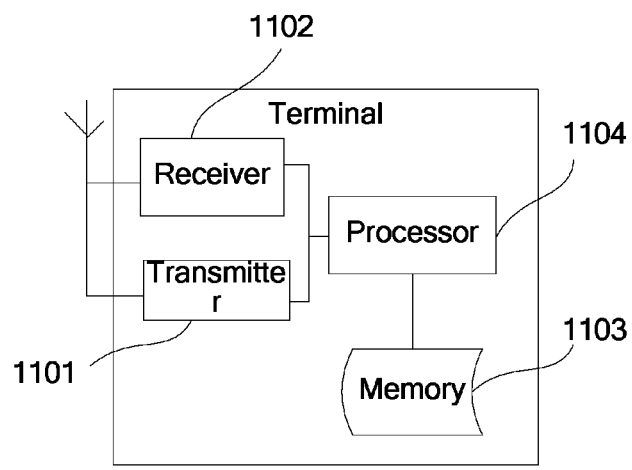
FIG. 10 is a schematic structural diagram of another terminal according to an embodiment of the present invention.

An embodiment of the present invention provides a terminal. As shown in FIG. 10, the terminal includes a transmitter 1001, a receiver 1002, a memory 1003, and a processor 1004 respectively connected to the transmitter 1001, the receiver 1002, and the memory 1003.

The memory 1003 stores a group of program code, and the processor 1004 is configured to invoke the program code stored in the memory 1003 to execute the following operations.

The receiver 1002 is configured to obtain measurement configuration information that is sent by a server through a base station.

The measurement configuration information carries a positioning measurement parameter. The positioning measurement parameter is a parameter that the server requests the terminal to measure and is used to position the terminal. The positioning measurement parameter includes at least one of the following parameters or parameter combinations: a precoding matrix indicator PMI/rank indicator RI characteristic and the number of multiple paths of the terminal, a handover failure rate measured by the terminal, a radio link failure rate measured by the terminal, a signal to interference plus noise ratio of the terminal, and the number of cells from which the terminal receives strong interference.

It should be noted that possible implementations in which the receiver 1002 obtains the positioning measurement parameter carried in the measurement configuration information are the same as the implementations in which the terminal receives the positioning measurement parameter in the foregoing embodiments, which are not further described herein.

Specifically, when the measurement configuration information includes first measurement configuration information, the receiver 1002 is specifically configured to receive the first measurement configuration information sent by the base station.

The first measurement configuration information is information that is generated according to the positioning measurement parameter by the base station after receiving the measurement configuration information sent by the server and obtaining the positioning measurement parameter by parsing the measurement configuration information, and that requests the terminal to measure the positioning measurement parameter. The first measurement configuration information carries the positioning measurement parameter.

The processor 1004 is configured to perform measurement according to the positioning measurement parameter carried in the measurement configuration information, to obtain a positioning response parameter, and generate configuration response information carrying the positioning response parameter.

The positioning response parameter is a measurement result generated after the terminal measures the positioning measurement parameter.

The transmitter 1001 is configured to send the configuration response information generated by the processor 1004 to the server through the base station.

The configuration response information carries the positioning response parameter.

Specifically, if the receiver 1002 receives the first measurement configuration information sent by the base station, the configuration response information includes first configuration response information.

The transmitter 1001 is specifically configured to send the first configuration response information to the base station, so that after receiving the first configuration response information, the base station generates configuration response information sent to the server, and sends the configuration response information to the server.

The configuration response information carries the positioning response parameter.

The embodiment of the present invention provides a terminal, where the terminal receives measurement configuration information carrying a positioning measurement parameter, and performs measurement according to the positioning measurement parameter, to obtain a positioning response parameter; and the terminal adds the positioning response parameter to configuration response information, and sends the configuration response information to a server through a base station, so that the server positions the terminal according to the positioning response parameter when receiving the configuration response information carrying the positioning response parameter. In this way, the server can position the terminal according to at least one parameter of the terminal related to a position of the terminal, which can position the terminal more accurately, thereby improving the positioning precision.

Figure 11:
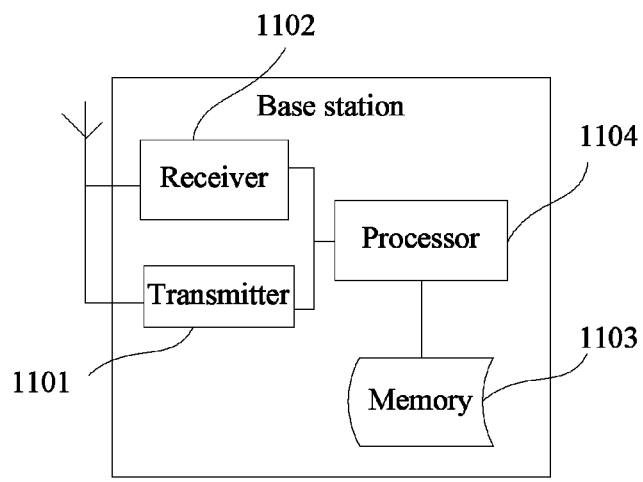
FIG. 11 is a schematic structural diagram of another base station according to an embodiment of the present invention.

An embodiment of the present invention provides a base station. As shown in FIG. 11, the base station includes a transmitter 1101, a receiver 1102, a memory 1103, and a processor 1104 respectively connected to the transmitter 1101, the receiver 1102, and the memory 1103.

The memory 1103 stores a group of program code, and the processor 1104 is configured to invoke the program code stored in the memory 1103 to execute the following operations.

The receiver 1102 is configured to receive measurement configuration information sent by a server.

The measurement configuration information carries a positioning measurement parameter.

The positioning measurement parameter is a parameter that the server requests a terminal to measure and is used to position the terminal. The positioning measurement parameter includes at least one of the following parameters or parameter combinations:

a precoding matrix indicator PMI/rank indicator RI characteristic and the number of multiple paths of the terminal, a handover failure rate measured by the terminal, a radio link failure rate measured by the terminal, a signal to interference plus noise ratio of the terminal, and the number of cells from which the terminal receives strong interference.

It should be noted that possible implementations in which the receiver 1102 obtains the positioning measurement parameter carried in the measurement configuration information are the same as the implementations in which the base station receives the positioning measurement parameter in the foregoing embodiments, which are not further described herein.

The transmitter 1101 is configured to send the measurement configuration information to the terminal.

The receiver 1102 is further configured to receive configuration response information sent by the terminal, where the configuration response information carries a positioning response parameter.

The positioning response parameter is a measurement result generated after the terminal measures the positioning measurement parameter.

The transmitter 1101 is further configured to send the configuration response information to the server.

Further, the processor 1104 is configured to parse the measurement configuration information received by the receiver 1102, to obtain the positioning measurement parameter.

The processor 1104 is further configured to generate first measurement configuration information, and add the positioning measurement parameter to the first measurement configuration information.

In this case, the transmitter 1101 being configured to send the measurement configuration information received by the receiver to the terminal includes: sending the first measurement configuration information generated by the processor 1104 to the terminal.

Further, the receiver 1102 being configured to receive configuration response information sent by the terminal includes: receiving first configuration response information sent by the terminal, where the first configuration response information carries a positioning response parameter.

The processor 1104 is further configured to parse the first configuration response information received by the receiver 1102, to obtain the positioning response parameter.

The processor 1104 is further configured to generate configuration response information sent to the server, and add the positioning response parameter to the configuration response information sent to the server.

In this case, the transmitter 1101 being configured to send the configuration response information received by the receiver to the server includes: sending the configuration response information generated by the processor 1104 to the server.

The embodiment of the present invention provides a base station and a positioning method, where after receiving measurement configuration information sent by a server, if the base station cannot parse the measurement configuration information, the base station directly sends the measurement configuration information to a terminal; if the base station can parse the measurement configuration information, the base station obtains, by parsing, a positioning measurement parameter carried in the measurement configuration information, adds the positioning measurement parameter to first measurement configuration information, and sends the first measurement configuration information to the terminal, so that the terminal receives the first measurement configuration information carrying the positioning measurement parameter, and performs measurement according to the positioning measurement parameter, to obtain a positioning response parameter; and the base station sends obtained configuration response information to the server, so that the server positions the terminal according to the positioning response parameter when receiving the configuration response information carrying the positioning response parameter. In this way, the server can position the terminal according to at least one parameter of the terminal related to a position of the terminal, which can position the terminal more accurately, thereby improving the positioning precision.

Figure 12:
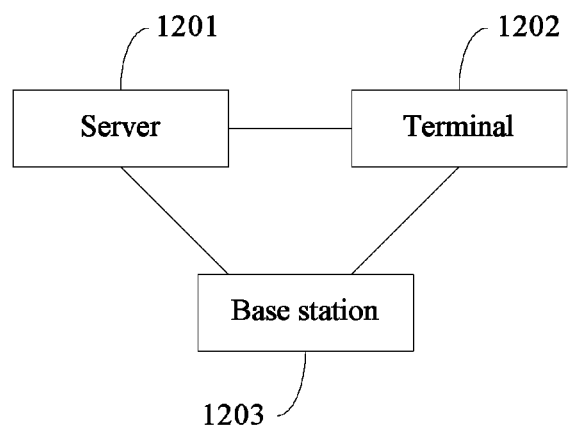
FIG. 12 is a schematic diagram of a positioning system according to an embodiment of the present invention.

An embodiment of the present invention provides a positioning system. As shown in FIG. 12, the system includes: a server 1201, a terminal 1202, and a base station 1203.

The server 1201 is the server according to the foregoing embodiments.

The terminal 1202 is the terminal according to the foregoing embodiments.

The base station 1203 is the base station according to the foregoing embodiments.

The embodiments of the present invention provide a positioning method, apparatus, and system, where a server sends measurement configuration information carrying a positioning measurement parameter to a base station; after receiving the measurement configuration information carrying the positioning measurement parameter, if the measurement configuration information sent by the server can be parsed, the base station obtains the positioning measurement parameter by parsing, adds the positioning measurement parameter to first measurement configuration information, and sends the first measurement configuration information to a terminal; if the measurement configuration information sent by the server cannot be parsed, the base station forwards the measurement configuration information to the terminal, so that after receiving the measurement configuration information, the terminal performs measurement according to the positioning measurement parameter, to obtain a positioning response parameter, adds the positioning response parameter to configuration response information, and sends the configuration response information to the base station; the base station sends the configuration response information to the server; and when receiving first configuration response information carrying the positioning response parameter, the server positions the terminal according to the positioning response parameter. In this way, the server can position the terminal according to at least one parameter of the terminal related to a position of the terminal, which can position the terminal more accurately, thereby improving the positioning precision.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A server, comprising:
 a processor, configured to:
  send, through a transmitter, a request message to obtain scenario information of a terminal to a base station,
  obtain, through a receiver, the scenario information of the terminal from a response message of the base station, so as to determine the scenario information of the terminal among a plurality of possible scenario information, the plurality of possible scenario information including carrier aggregation (CA) scenario information, coordinated multi-point (CoMP) scenario information, minimization of drive tests (MDT) scenario information, wide area network (WAN) scenario information, and wireless fidelity (WiFi) scenario information,
  determine a positioning measurement parameter according to the scenario information of the terminal determined by the processor,
  generate measurement configuration information carrying the positioning measurement parameter, and
  send the measurement configuration information to the terminal through the transmitter,
  wherein the positioning measurement parameter is a parameter that the server requests the terminal to measure and is used to position the terminal, and the positioning measurement parameter determined by the processor comprises some or all of the following parameters which are selectively chosen depending on the scenario information of the terminal determined by the processor:
   a precoding matrix indicator (PMI)/rank indicator (RI) characteristic and the number of multiple paths of the terminal, a handover failure rate measured by the terminal, a radio link failure rate measured by the terminal, a signal to interference plus noise ratio of the terminal, and a number of cells from which the terminal receives strong interference;
 the transmitter, configured to send the measurement configuration information generated by the processor to the terminal through the base station; and
 a receiver, configured to receive, through the base station, configuration response information returned by the terminal, wherein the configuration response information carries a positioning response parameter, and the positioning response parameter is a measurement result generated after the terminal measures the positioning measurement parameter, wherein
 the processor is further configured to position the terminal according to the positioning response parameter carried in the configuration response information received by the receiver,
 wherein
 the processor is configured to, if the scenario information of the terminal comprises the CA scenario information, determine the signal to interference plus noise ratio of the terminal, the number of cells from which the terminal receives strong interference, and the PMI/RI characteristic and the number of multiple paths of the terminal as positioning measurement parameters.

2. The server according to claim 1, wherein,
if the scenario information of the terminal comprises: the CoMP scenario information, the processor is configured to determine the signal to interference plus noise ratio of the terminal, the number of cells from which the terminal receives strong interference, and the PMI/RI characteristic and the number of multiple paths of the terminal as the positioning measurement parameters; and
if the scenario information of the terminal comprises: the MDT scenario information, the processor is configured to determine the handover failure rate measured by the terminal and the radio link failure rate measured by the terminal as the positioning measurement parameters.

3. The server according to claim 2, wherein,
if the scenario information of the terminal comprises: the CA scenario information, the processor is further configured to determine a number of carriers used by the terminal and an angle of rotation relative to a true north direction as the positioning measurement parameters, wherein the angle of rotation is measured by a gyroscope of the terminal;
if the scenario information of the terminal comprises: the CoMP scenario information, the processor is further configured to determine a number of measurement access point(s) used by the terminal and signal strength, and the angle of rotation relative to the true north direction as the positioning measurement parameters, wherein the angle of rotation is measured by the gyroscope of the terminal; and
if the scenario information of the terminal comprises: the wide area network (WAN) or wireless fidelity (WiFi) scenario information, the processor is further configured to determine the number of access point(s) and access point identification(s) as the positioning measurement parameters, wherein the access point(s) and the access point identification(s) are detected by the terminal.

4. The server according to claim 1, wherein,
the positioning measurement parameter further comprises at least one of the following parameters or parameter combinations: a number of carriers used by the terminal, a number of measurement access point(s) used by the terminal and signal strength, an angle of rotation relative to a true north direction, and a number of access point(s) and access point identification(s), wherein the angle of rotation is measured by a gyroscope of the terminal, and the access point(s) and the access point identification(s) are detected by the terminal.

5. The server according to claim 1, wherein,
the transmitter is configured to send the measurement configuration information to the base station, so that after receiving the measurement configuration information, the base station generates first measurement configuration information, and sends the first measurement configuration information to a corresponding terminal, wherein the first measurement configuration information is information that is generated according to the positioning measurement parameter by the base station after receiving the measurement configuration information sent by the server and obtaining the positioning measurement parameter by parsing the measurement configuration information, and that requests the terminal to measure the positioning measurement parameter; and the first measurement configuration information carries the positioning measurement parameter.

6. The server according to claim 1, wherein,
the processor is further configured to save positioning parameter values that correspond to all rasters after a network is rasterized; and
the processor is further configured to position the terminal by comparing the positioning response parameter with the positioning parameter values that correspond to all rasters after a network is rasterized, using a raster with a positioning parameter value closest to the positioning response parameter as a matched raster, and using a position of the matched raster as a position of the terminal.

7. A terminal, comprising:
a receiver, configured to
receive, through a base station, a request message from a server requesting scenario information of the terminal, to thereby identify the scenario information of the terminal among a plurality of possible scenario information, the plurality of possible scenario information including carrier aggregation (CA) scenario information, coordinated multi-point (CoMP) scenario information, minimization of drive tests (MDT) scenario information, wide area network (WAN) scenario information, and wireless fidelity (WiFi) scenario information, and
obtain measurement configuration information from the server through the base station, wherein the measurement configuration information carries a positioning measurement parameter, the positioning measurement parameter is a parameter that the server determines according to the scenario information of the terminal and requests the terminal to measure and is used to position the terminal, and the positioning measurement parameter comprises some or all of the following parameters which are selectively chosen depending on the scenario information of the terminal:
a precoding matrix indicator (PMI)/rank indicator (RI) characteristic and the number of multiple paths of the terminal, a handover failure rate measured by the terminal, a radio link failure rate measured by the terminal, a signal to interference plus noise ratio of the terminal, and a number of cells from which the terminal receives strong interference;
a processor, configured to perform measurement according to the positioning measurement parameter carried in the measurement configuration information received by the receiver, to obtain a positioning response parameter, and generate configuration response information carrying the positioning response parameter, wherein the positioning response parameter is a measurement result generated after the terminal measures the positioning measurement parameter; and
a transmitter, configured to send the configuration response information generated by the processor to the server through the base station, wherein the configuration response information carries the positioning response parameter,
wherein
if the scenario information of the terminal comprises the CA scenario information, the positioning measurement parameter received by the receiver comprises: the signal to interference plus noise ratio of the terminal, the number of cells from which the terminal receives strong interference, and the PMI/RI characteristic and the number of multiple paths of the terminal.

8. The terminal according to claim 7, wherein,
if the scenario information of the terminal comprises: the CoMP scenario information, the positioning measurement parameter received by the receiver comprises: the signal to interference plus noise ratio of the terminal, the number of cells from which the terminal receives strong interference, and the PMI/RI characteristic and the number of multiple paths of the terminal; or
if the scenario information of the terminal comprises: the MDT scenario information, the positioning measurement parameter received by the receiver comprises: the handover failure rate measured by the terminal and the radio link failure rate measured by the terminal.

9. The terminal according to claim 8, wherein,
if the scenario information of the terminal comprises: the CA scenario information, the positioning measurement parameter received by the receiver further comprises: a number of carriers used by the terminal and an angle of rotation relative to a true north direction, wherein the angle of rotation is measured by a gyroscope of the terminal; or
if the scenario information of the terminal comprises: the CoMP scenario information, the positioning measurement parameter received by the receiver further comprises: a number of measurement access point(s) used by the terminal and signal strength, and an angle of rotation relative to a true north direction, wherein the angle of rotation is measured by a gyroscope of the terminal; or
if the scenario information of the terminal comprises: the wide area network WAN or wireless fidelity WiFi scenario information, the positioning measurement parameter received by the receiver further comprises: a number of access point(s) and access point identification(s), wherein the access point(s) and the access point identification(s) are detected by the terminal.

10. The terminal according to claim 7, wherein the positioning measurement parameter received by the receiver further comprises at least one of the following parameters or parameter combinations: a number of carriers used by the terminal, a number of measurement access point(s) used by the terminal and signal strength, an angle of rotation relative to a true north direction, and a number of access point(s) and access point identification(s), wherein the angle of rotation is measured by a gyroscope of the terminal, and the access point(s) and the access point identification(s) are detected by the terminal.

11. The terminal according to claim 7, wherein,
when the measurement configuration information comprises first measurement configuration information, the receiver is further configured to receive the first measurement configuration information sent by the base station, wherein the first measurement configuration information is information that is generated according to the positioning measurement parameter by the base station after receiving the measurement configuration information sent by the server and obtaining the positioning measurement parameter by parsing the measurement configuration information, and that requests the terminal to measure the positioning measurement parameter, and the first measurement configuration information carries the positioning measurement parameter;
the configuration response information comprises first configuration response information; and the transmitter is configured to send the first configuration response information to the base station, so that after receiving the first configuration response information, the base station generates configuration response information to be sent to the server, and sends the configuration response information to the server, wherein the configuration response information carries the positioning response parameter.

12. A base station, comprising:
a receiver, configured to
receive, from a server, a request message to obtain scenario information of a terminal among a plurality of possible scenario information, the plurality of possible scenario information including carrier aggregation (CA) scenario information, coordinated multi-point (CoMP) scenario information, minimization of drive tests (MDT) scenario information, wide area network (WAN) scenario information, and wireless fidelity (WiFi) scenario information,
receive measurement configuration information from the server, wherein the measurement configuration information carries a positioning measurement parameter, the positioning measurement parameter is a parameter that the server determines according to the scenario information of the terminal and requests the terminal to measure and is used to position the terminal, and the positioning measurement parameter comprises some or all of the following parameters which are selectively chosen depending on the scenario information of the terminal:
a precoding matrix indicator PMI/rank indicator RI characteristic and the number of multiple paths of the terminal, a handover failure rate measured by the terminal, a radio link failure rate measured by the terminal, a signal to interference plus noise ratio of the terminal, and a number of cells from which the terminal receives strong interference; and
a transmitter, configured to send the request message received by the receiver to the terminal and to send the measurement configuration information received by the receiver to the terminal, wherein
the receiver is further configured to receive configuration response information sent by the terminal, wherein the configuration response information carries a positioning response parameter, and the positioning response parameter is a measurement result generated after the terminal measures the positioning measurement parameter; and
the transmitter is further configured to send the configuration response information received by the receiver to the server,
wherein
if the scenario information of the terminal comprises the CA scenario information, the positioning measurement parameter received by the receiver comprises: the signal to interference plus noise ratio of the terminal, the number of cells from which the terminal receives strong interference, and the PMI/RI characteristic and the number of multiple paths of the terminal.

13. The base station according to claim 12, further comprising:
a processor, configured to parse the measurement configuration information received by the receiver, to obtain the positioning measurement parameter, wherein the processor is further configured to generate first measurement configuration information, and add the positioning measurement parameter to the first measurement configuration information;

the transmitter being configured to send the measurement configuration information received by the receiver to the terminal comprises: sending the first measurement configuration information generated by the processor to the terminal;

the receiver being configured to receive configuration response information sent by the terminal comprises: receiving first configuration response information sent by the terminal, wherein the first configuration response information carries the positioning response parameter;

the processor is further configured to parse the first configuration response information received by the receiver, to obtain the positioning response parameter;

the processor is further configured to generate configuration response information sent to the server, and add the positioning response parameter to the configuration response information; and the transmitter being configured to send the configuration response information received by the receiver to the server comprises: sending the configuration response information generated by the processor to the server.

14. The base station according to claim 12, wherein, if the scenario information of the terminal comprises: the CoMP scenario information, the positioning measurement parameter received by the receiver comprises: the signal to interference plus noise ratio of the terminal, the number of cells from which the terminal receives strong interference, and the PMI/RI characteristic and the number of multiple paths of the terminal; or if the scenario information of the terminal comprises: the MDT scenario information, the positioning measurement parameter received by the receiver comprises: the handover failure rate measured by the terminal and the radio link failure rate measured by the terminal.

15. The base station according to claim 14, wherein, if the scenario information of the terminal comprises: the CA scenario information, the positioning measurement parameter received by the receiver further comprises: a number of carriers used by the terminal and an angle of rotation relative to a true north direction, wherein the angle of rotation is measured by a gyroscope of the terminal; or if the scenario information of the terminal comprises: the CoMP scenario information, the positioning measurement parameter received by the receiver further comprises: a number of measurement access point(s) used by the terminal and signal strength, and an angle of rotation relative to a true north direction, wherein the angle of rotation is measured by a gyroscope of the terminal; or if the scenario information of the terminal comprises: the wide area network (WAN) or wireless fidelity (WiFi) scenario information, the positioning measurement parameter received by the receiver further comprises: a number of access point(s) and access point identification(s), wherein the access point(s) and the access point identification(s) are detected by the terminal.

16. The base station according to claim 12, wherein the positioning measurement parameter received by the receiver further comprises at least one of the following parameters or parameter combinations: a number of carriers used by the terminal, a number of measurement access point(s) used by the terminal and signal strength, an angle of rotation relative to a true north direction, and the number of access point(s) and access point identification(s), wherein the angle of rotation is measured by a gyroscope of the terminal, and the access point(s) and the access point identification(s) are detected by the terminal.

17. A positioning system, comprising:
a server; and
a base station, wherein
the server comprises:
a processor, configured to
send, through a transmitter, a request message to obtain scenario information of a terminal to the base station,
obtain, through a receiver, the scenario information of the terminal from a response message fed back by the base station, so as to determine the scenario information of the terminal among a plurality of possible scenario information, the plurality of possible scenario information including carrier aggregation (CA) scenario information, coordinated multi-point (CoMP) scenario information, minimization of drive tests (MDT) scenario information, wide area network (WAN) scenario information, and wireless fidelity (WiFi) scenario information,
determine a positioning measurement parameter according to the scenario information of the terminal determined by the processor,
generate measurement configuration information carrying the positioning measurement parameter, and
send the measurement configuration information to the terminal through the transmitter,
wherein the positioning measurement parameter is a parameter that the server requests the terminal to measure and is used to position the terminal, and the positioning measurement parameter determined by the processor comprises some or all of the following parameters which are selectively chosen depending on the scenario information of the terminal determined by the processor:
a precoding matrix indicator (PMI)/rank indicator (RI) characteristic and the number of multiple paths of the terminal, a handover failure rate measured by the terminal, a radio link failure rate measured by the terminal, a signal to interference plus noise ratio of the terminal, and a number of cells from which the terminal receives strong interference;
the transmitter, configured to send the measurement configuration information generated by the processor to the terminal through the base station; and
a receiver, configured to receive, through the base station, configuration response information returned by the terminal, wherein the configuration response information carries a positioning response parameter, and the positioning response parameter is a measurement result generated after the terminal measures the positioning measurement parameter,
wherein
the processor is further configured to position the terminal according to the positioning response parameter carried in the configuration response information received by the receiver, and
the processor is further configured to, if the scenario information of the terminal comprises the CA scenario information, determine the signal to interference plus noise ratio of the terminal, the number of cells from which the terminal receives strong interference, and the PMI/RI characteristic and the number of multiple paths of the terminal as positioning measurement parameters; and the base station comprises:

a base receiver, configured to receive the measurement configuration information sent by the server, a base transmitter, configured to send the measurement configuration information received by the base receiver to the terminal, wherein the base receiver is further configured to receive configuration response information sent by the terminal, wherein the configuration response information carries a positioning response parameter, and the positioning response parameter is a measurement result generated after the terminal measures the positioning measurement parameter; and the base transmitter is further configured to send the configuration response information received by the base receiver to the server.

* * * * *